USO11832258B2

(12) United States Patent
Luo et al.

(10) Patent No.: US 11,832,258 B2
(45) Date of Patent: Nov. 28, 2023

(54) TECHNIQUES AND APPARATUSES FOR WAVEFORM SIGNALING FOR DOWNLINK COMMUNICATIONS

(71) Applicant: QUALCOMM Incorporated, San Diego, CA (US)

(72) Inventors: Tao Luo, San Diego, CA (US); Jing Sun, San Diego, CA (US); Sony Akkarakaran, Poway, CA (US); Tamer Kadous, San Diego, CA (US); Xiao feng Wang, San Diego, CA (US); Akula Reddy, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 654 days.

(21) Appl. No.: 16/863,265

(22) Filed: Apr. 30, 2020

(65) Prior Publication Data
US 2020/0260438 A1    Aug. 13, 2020

Related U.S. Application Data

(62) Division of application No. 15/726,229, filed on Oct. 5, 2017, now Pat. No. 10,667,244.
(Continued)

(51) Int. Cl.
*H04W 72/21*   (2023.01)
*H04L 1/00*    (2006.01)
(Continued)

(52) U.S. Cl.
CPC .......... *H04W 72/21* (2023.01); *H04B 7/0452* (2013.01); *H04L 1/0025* (2013.01);
(Continued)

(58) Field of Classification Search
CPC .. H04W 72/0413; H04W 72/042; H04B 7/00; H04B 7/0452; H04L 1/0025;
(Continued)

(56) References Cited

U.S. PATENT DOCUMENTS 8,526,347 B2    9/2013  Wang et al.
8,913,672 B2   12/2014  Luo et al.
(Continued)

FOREIGN PATENT DOCUMENTS

CN    105556889 A    5/2016
EP      2824858 A1    1/2015
(Continued)

OTHER PUBLICATIONS

International Search Report and Written Opinion—PCT/US2018/020142—ISA/EPO—dated Jul. 11, 2018.
(Continued)

*Primary Examiner* — Chi H Pham
*Assistant Examiner* — Weibin Huang
(74) *Attorney, Agent, or Firm* — Harrity & Harrity, LLP

(57) ABSTRACT

When a base station is capable of using multiple different types of waveforms for a downlink communication to a UE, the UE may waste processing resources attempting to receive and/or process the downlink communication. For example, the UE may cycle through various possible types of waveforms in an attempt to process the downlink communication. Techniques described herein use waveform signaling for downlink communications to notify the UE of a type of waveform being used for a downlink communication, thereby conserving UE resources (e.g., processing resources, memory resources, RF resources, and/or the like) that would otherwise be wasted attempting to process the downlink communication using multiple types of waveforms.

30 Claims, 16 Drawing Sheets

Related U.S. Application Data

(60) Provisional application No. 62/475,512, filed on Mar. 23, 2017.

(51) Int. Cl.
   *H04L 5/00*    (2006.01)
   *H04B 7/0452*  (2017.01)
   *H04W 72/23*   (2023.01)
   *H04B 7/00*    (2006.01)
   *H04L 1/1867*  (2023.01)
   *H04L 1/1829*  (2023.01)

(52) U.S. Cl.
   CPC .......... *H04L 1/0028* (2013.01); *H04L 1/0039* (2013.01); *H04L 5/001* (2013.01); *H04L 5/0023* (2013.01); *H04L 5/0053* (2013.01); *H04L 5/0091* (2013.01); *H04W 72/23* (2023.01); *H04B 7/00* (2013.01); *H04L 1/0003* (2013.01); *H04L 1/1854* (2013.01); *H04L 1/1887* (2013.01); *H04L 5/0044* (2013.01); *H04L 5/0048* (2013.01)

(58) Field of Classification Search
   CPC ..... H04L 1/0028; H04L 1/0039; H04L 5/001; H04L 5/0023; H04L 5/0053; H04L 5/0091; H04L 1/0003; H04L 1/1854; H04L 1/1887; H04L 5/0044; H04L 5/0048
   See application file for complete search history.

(56) References Cited

U.S. PATENT DOCUMENTS

| | | | |
|---|---|---|---|
| 2012/0155423 A1 | 6/2012 | Kishiyama et al. | |
| 2013/0064170 A1 | 3/2013 | Lee et al. | |
| 2013/0235783 A1* | 9/2013 | Wang | H04B 7/024 370/312 |
| 2014/0111279 A1* | 4/2014 | Brobston | H03F 3/245 330/286 |
| 2014/0146754 A1* | 5/2014 | Bayesteh | H04W 72/21 370/329 |
| 2015/0023315 A1* | 1/2015 | Yerramalli | H04W 74/002 370/329 |
| 2016/0087707 A1 | 3/2016 | Guey et al. | |
| 2016/0205569 A1* | 7/2016 | Han | H04L 25/03012 370/252 |
| 2016/0294521 A1 | 10/2016 | Au et al. | |
| 2018/0270799 A1 | 9/2018 | Noh et al. | |
| 2018/0279292 A1 | 9/2018 | Luo et al. | |
| 2018/0324715 A1 | 11/2018 | Ryoo et al. | |
| 2019/0173712 A1* | 6/2019 | Yamamoto | H04L 27/0008 |
| 2019/0260623 A1 | 8/2019 | Li et al. | |
| 2019/0327685 A1* | 10/2019 | Zhao | H04L 27/2607 |
| 2019/0334751 A1* | 10/2019 | Liu | H04L 5/0051 |

FOREIGN PATENT DOCUMENTS

| | | |
|---|---|---|
| WO | 2015023895 A1 | 2/2015 |
| WO | 2016171765 A1 | 10/2016 |

OTHER PUBLICATIONS

International Preliminary Report on Patentability—PCT/US2018/020142, The International Bureau of WIPO—Geneva, Switzerland, dated Sep. 24, 2019.

Partial International Search Report—PCT/US2018/020142—ISA/EPO—dated May 16, 2018.

European Search Report—EP22152176—Search Authority—Munich—dated Jul. 29, 2022.

Partial European Search Report—EP22152176—Search Authority—The Hague—dated Apr. 28, 2022.

European Search Report—EP22197763—Search Authority—The Hague—dated Nov. 24, 2022.

* cited by examiner

TECHNIQUES AND APPARATUSES FOR WAVEFORM SIGNALING FOR DOWNLINK COMMUNICATIONS

CROSS-REFERENCE TO RELATED APPLICATIONS UNDER 35 U.S.C. § 119

This application is a divisional of U.S. patent application Ser. No. 15/726,229, filed Oct. 5, 2017, entitled "TECHNIQUES AND APPARATUSES FOR WAVEFORM SIGNALING FOR DOWNLINK COMMUNICATIONS," which claims priority to U.S. Provisional Patent Application No. 62/475,512, filed Mar. 23, 2017, entitled "TECHNIQUES AND APPARATUSES FOR WAVEFORM SIGNALING FOR DOWNLINK COMMUNICATIONS," which are hereby expressly incorporated by reference herein.

BACKGROUND

Field

Aspects of the present disclosure generally relate to wireless communication, and more particularly to techniques and apparatuses for waveform signaling for downlink communications.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a 5G BS, a 5G Node B, and/or the like.

The above multiple access technologies have been adopted in various telecommunication standards to provide a common protocol that enables different wireless communication devices to communicate on a municipal, national, regional, and even global level. 5G, which may also be referred to as New Radio (NR), is a set of enhancements to the LTE mobile standard promulgated by the Third Generation Partnership Project (3GPP). 5G is designed to better support mobile broadband Internet access by improving spectral efficiency, lowering costs, improving services, making use of new spectrum, and better integrating with other open standards using OFDM with a cyclic prefix (CP) (CP-OFDM) on the downlink (DL), using CP-OFDM and/or SC-1-DM (e.g., also known as discrete Fourier transform spread ODFM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and 5G technologies. Preferably, these improvements should be applicable to other multiple access technologies and the telecommunication standards that employ these technologies.

In 5G, different types of waveforms may be used for uplink and/or downlink communications. For example, such communications may be transmitted and/or received using a DFT-s-OFDM waveform, a CP-OFDM waveform, and/or the like, depending on one or more factors, such as a network condition, a performance parameter, a type of communication being transmitted, and/or the like. For example, a DFT-s-OFDM waveform may be used to achieve performance benefits associated with a lower peak to average power ratio (PAPR), a CP-OFDM waveform may be used to achieve performance benefits associated with a higher spectral efficiency, and/or the like. When a base station is capable of using multiple different types of waveforms for a downlink communication to a UE, the UE may waste processing resources attempting to receive and/or process the downlink communication. For example, the UE may cycle through various possible types of waveforms in an attempt to process the downlink communication.

SUMMARY

Techniques described herein use waveform signaling for downlink communications to notify the UE of a type of waveform being used for a downlink communication, thereby conserving UE resources (e.g., processing resources, memory resources, RF resources, and/or the like) that would otherwise be wasted attempting to process the downlink communication using multiple types of waveforms.

In an aspect of the disclosure, a method, a user equipment (UE), a base station, an apparatus, and a computer program product are provided.

In some aspects, the method may include receiving, by a UE, a waveform indication in a first downlink channel that uses a first waveform of a plurality of waveforms; determining, by the UE, a second waveform, of the plurality of waveforms, to be used for one or more downlink communications in a second downlink channel based at least in part on the waveform indication received in the first downlink channel; and processing, by the UE, the one or more downlink communications received in the second downlink channel using the second waveform.

In some aspects, the method may include generating, by a base station, a first transmission layer of a multi-layer communication using a first waveform of a plurality of waveforms; generating, by the base station, a second transmission layer of the multi-layer communication using a second waveform of the plurality of waveforms, wherein the first waveform and the second waveform are different; and transmitting, by the base station, the first transmission layer and the second transmission layer using a same time resource and a same frequency resource, wherein the first transmission layer is transmitted using the first waveform and the second transmission layer is transmitted using the second waveform.

In some aspects, the method may include receiving, by a first UE, a first indication of a first waveform, of a plurality of waveforms, to be used for one or more downlink communications associated with the first UE; receiving, by the first UE, a second indication of a second waveform, of the plurality of waveforms, associated with downlink communications of a second UE; receiving, by the first UE, the one or more downlink communications using the first waveform; and processing, by the first UE, the one or more downlink communications based at least in part on the second indication of the second waveform.

In some aspects, the UE may include a memory and one or more processors coupled to the memory. The memory and the one or more processors may be configured to receive a waveform indication in a first downlink channel that uses a first waveform of a plurality of waveforms; determine a second waveform, of the plurality of waveforms, to be used for one or more downlink communications in a second downlink channel based at least in part on the waveform indication received in the first downlink channel; and process the one or more downlink communications received in the second downlink channel using the second waveform.

In some aspects, the base station may include a memory and one or more processors coupled to the memory. The memory and the one or more processors may be configured to generate a first transmission layer of a multi-layer communication using a first waveform of a plurality of waveforms; generate a second transmission layer of the multi-layer communication using a second waveform of the plurality of waveforms, wherein the first waveform and the second waveform are different; and transmit the first transmission layer and the second transmission layer using a same time resource and a same frequency resource, wherein the first transmission layer is transmitted using the first waveform and the second transmission layer is transmitted using the second waveform.

In some aspects, a first UE may include a memory and one or more processors coupled to the memory. The memory and the one or more processors may be configured to receive a first indication of a first waveform, of a plurality of waveforms, to be used for one or more downlink communications associated with the first UE; receive a second indication of a second waveform, of the plurality of waveforms, associated with downlink communications of a second UE; receive the one or more downlink communications using the first waveform; and process the one or more downlink communications based at least in part on the second indication of the second waveform.

In some aspects, the apparatus may include means for receiving a waveform indication in a first downlink channel that uses a first waveform of a plurality of waveforms; means for determining a second waveform, of the plurality of waveforms, to be used for one or more downlink communications in a second downlink channel based at least in part on the waveform indication received in the first downlink channel; and means for processing the one or more downlink communications received in the second downlink channel using the second waveform.

In some aspects, the apparatus may include means for generating a first transmission layer of a multi-layer communication using a first waveform of a plurality of waveforms; means for generating a second transmission layer of the multi-layer communication using a second waveform of the plurality of waveforms, wherein the first waveform and the second waveform are different; and means for transmitting the first transmission layer and the second transmission layer using a same time resource and a same frequency resource, wherein the first transmission layer is transmitted using the first waveform and the second transmission layer is transmitted using the second waveform.

In some aspects, the apparatus may include means for receiving a first indication of a first waveform, of a plurality of waveforms, to be used for one or more downlink communications associated with a first UE; means for receiving a second indication of a second waveform, of the plurality of waveforms, associated with downlink communications of a second UE; means for receiving the one or more downlink communications using the first waveform; and means for processing the one or more downlink communications based at least in part on the second indication of the second waveform.

In some aspects, the computer program product may include a non-transitory computer-readable medium storing one or more instructions for wireless communication. The one or more instructions, when executed by one or more processors, may cause the one or more processors to receive a waveform indication in a first downlink channel that uses a first waveform of a plurality of waveforms; determine a second waveform, of the plurality of waveforms, to be used for one or more downlink communications in a second downlink channel based at least in part on the waveform indication received in the first downlink channel; and process the one or more downlink communications received in the second downlink channel using the second waveform.

In some aspects, the computer program product may include a non-transitory computer-readable medium storing one or more instructions for wireless communication. The one or more instructions, when executed by one or more processors, may cause the one or more processors to generate a first transmission layer of a multi-layer communication using a first waveform of a plurality of waveforms; generate a second transmission layer of the multi-layer communication using a second waveform of the plurality of waveforms, wherein the first waveform and the second waveform are different; and transmit the first transmission layer and the second transmission layer using a same time resource and a same frequency resource, wherein the first transmission layer is transmitted using the first waveform and the second transmission layer is transmitted using the second waveform.

In some aspects, the computer program product may include a non-transitory computer-readable medium storing one or more instructions for wireless communication. The one or more instructions, when executed by one or more processors, may cause the one or more processors to receive a first indication of a first waveform, of a plurality of waveforms, to be used for one or more downlink communications associated with a first UE; receive a second indication of a second waveform, of the plurality of waveforms, associated with downlink communications of a second UE; receive the one or more downlink communications using the first waveform; and process the one or more downlink communications based at least in part on the second indication of the second waveform.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

DETAILED DESCRIPTION

Figure 1:
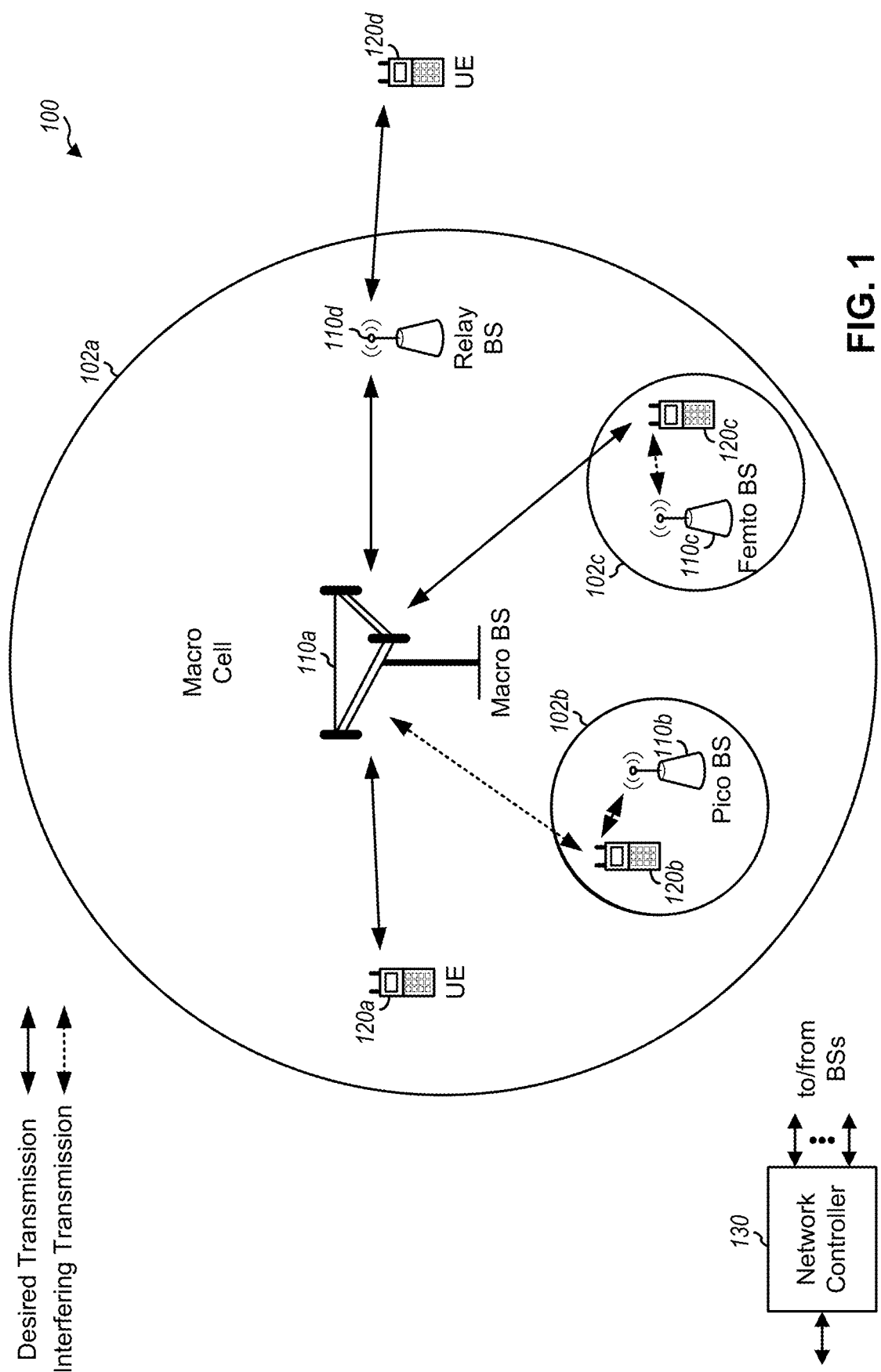
FIG. 1 is diagram illustrating an example of a wireless communication network.

The detailed description set forth below in connection with the appended drawings is intended as a description of various configurations and is not intended to represent the configurations in which the concepts described herein may be practiced. The detailed description includes specific details for the purposes of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, and/or the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, and/or the like, whether referred to as software, firmware, middleware, microcode, hardware description language, or otherwise.

Accordingly, in one or more example embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

An access point ("AP") may comprise, be implemented as, or known as a NodeB, a Radio Network Controller ("RNC"), an eNodeB (eNB), a Base Station Controller ("BSC"), a Base Transceiver Station ("BTS"), a Base Station ("BS"), a Transceiver Function ("TF"), a Radio Router, a Radio Transceiver, a Basic Service Set ("BSS"), an Extended Service Set ("ESS"), a Radio Base Station ("RBS"), a Node B (NB), a gNB, a 5G NB, a 5G BS, a Transmit Receive Point (TRP), or some other terminology.

An access terminal ("AT") may comprise, be implemented as, or be known as an access terminal, a subscriber station, a subscriber unit, a mobile station, a remote station, a remote terminal, a user terminal, a user agent, a user device, user equipment (UE), a user station, a wireless node, or some other terminology. In some aspects, an access terminal may comprise a cellular telephone, a smart phone, a cordless telephone, a Session Initiation Protocol ("SIP") phone, a wireless local loop ("WLL") station, a personal digital assistant ("PDA"), a tablet, a netbook, a smartbook, an ultrabook, a handheld device having wireless connection capability, a Station ("STA"), or some other suitable processing device connected to a wireless modem. Accordingly, one or more aspects taught herein may be incorporated into a phone (e.g., a cellular phone, a smart phone), a computer (e.g., a desktop), a portable communication device, a portable computing device (e.g., a laptop, a personal data assistant, a tablet, a netbook, a smartbook, an ultrabook), wearable device (e.g., smart watch, smart glasses, smart bracelet, smart wristband, smart ring, smart clothing, and/or the like), medical devices or equipment, biometric sensors/devices, an entertainment device (e.g., music device, video device, satellite radio, gaming device, and/or the like), a vehicular component or sensor, smart meters/sensors, industrial manufacturing equipment, a global positioning system device, or any other suitable device that is configured to communicate via a wireless or wired medium. In some aspects, the node is a wireless node. A wireless node may provide, for example, connectivity for or to a network (e.g., a wide area network such as the Internet or a cellular network) via a wired or wireless communication link.

Some UEs may be considered machine-type communication (MTC) UEs, which may include remote devices that may communicate with a base station, another remote device, or some other entity. Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example. Examples of MTC devices include sensors, meters, location tags, monitors, drones, robots/robotic devices, and/or the like. In some aspects, MTC devices may be referred to as enhanced MTC (eMTC) devices, LTE category M1 (LTE-M) devices, machine to machine (M2M) devices, and/or the like. Additionally, or alternatively, some UEs may be narrowband Internet of things (NB-IoT) devices.

It is noted that while aspects may be described herein using terminology commonly associated with 3G and/or 4G wireless technologies, aspects of the present disclosure can be applied in other generation-based communication systems, such as 5G and later.

FIG. 1 is a diagram illustrating a network 100 in which aspects of the present disclosure may be practiced. The network 100 may be an LTE network or some other wireless network, such as a 5G network. Wireless network 100 may include a number of BSs 110 (shown as BS 110a, BS 110b, BS 110c, and BS 110d) and other network entities. ABS is an entity that communicates with user equipment (UEs) and may also be referred to as a base station, a 5G BS, a Node B, a gNB, a 5G NB, an access point, a TRP, and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "5G BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium. Some UEs may be considered evolved or enhanced machine-type communication (eMTC) UEs. MTC and eMTC UEs include, for example, robots, drones, remote devices, such as sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices. Some UEs may be considered a Customer Premises Equipment (CPE).

When a BS 110 is capable of using multiple different types of waveforms for a downlink communication to a UE 120, the UE 120 may waste processing resources attempting to receive and/or process the downlink communication. For example, the UE 120 may cycle through various possible types of waveforms in an attempt to process the downlink communication. Techniques described herein use waveform signaling for downlink communications to notify the UE 120 of a type of waveform being used for a downlink communication, thereby conserving UE resources (e.g., processing resources, memory resources, RF resources, and/or the like) that would otherwise be wasted attempting to process the downlink communication using multiple types of waveforms.

In FIG. 1, a solid line with double arrows indicates desired transmissions between a UE and a serving BS, which is a BS designated to serve the UE on the downlink and/or uplink. A dashed line with double arrows indicates potentially interfering transmissions between a UE and a BS.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, 5G RAT networks may be deployed.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As indicated above, FIG. 1 is provided merely as an example. Other examples are possible and may differ from what was described with regard to FIG. 1.

Figure 2:
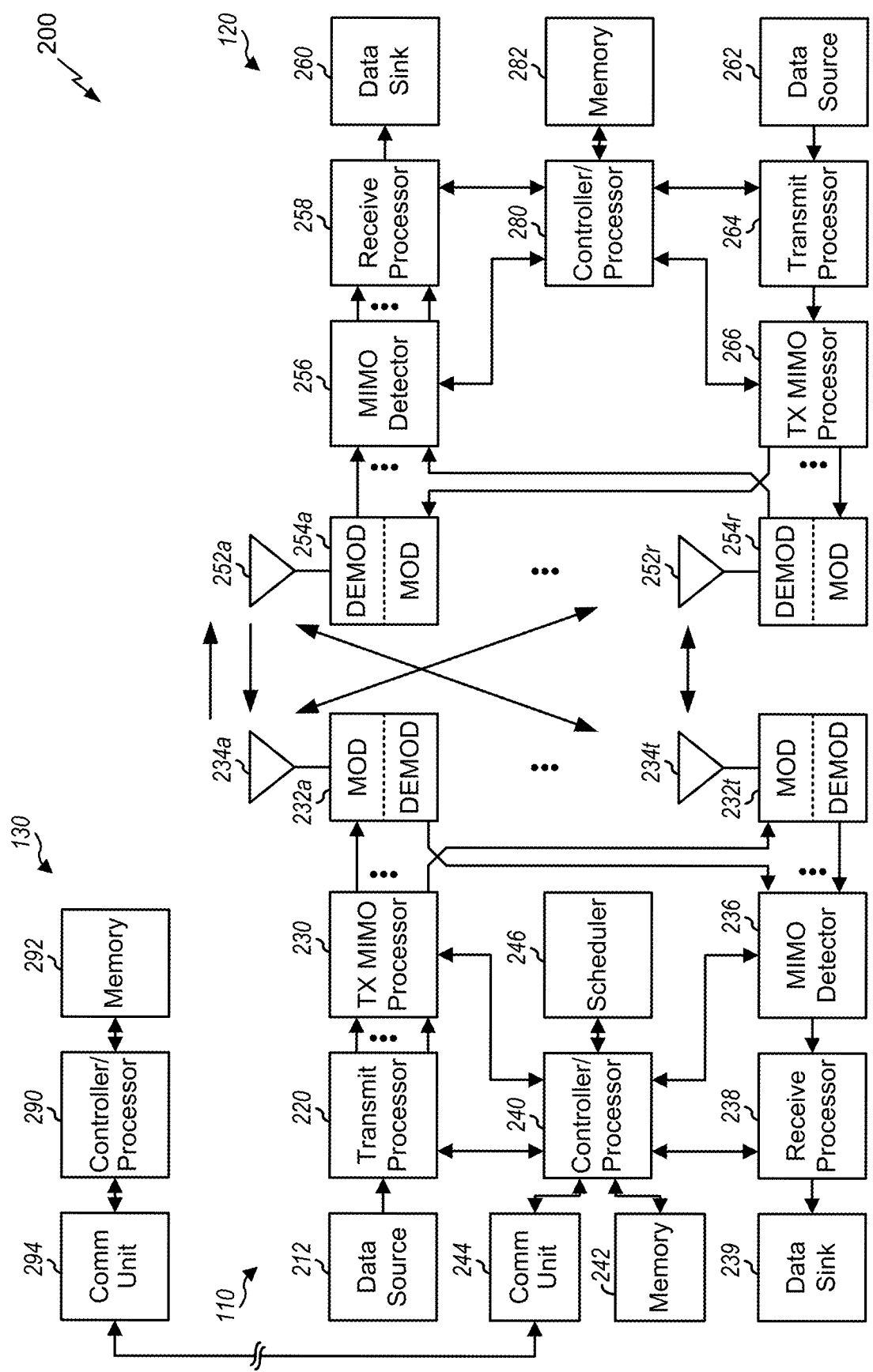
FIG. 2 is a diagram illustrating an example of a base station in communication with a user equipment (UE) in a wireless communication network.

FIG. 2 shows a block diagram 200 of a design of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation or coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI), and/or the like) and control information (e.g., CQI requests, grants, upper layer signaling, and/or the like) and provide overhead symbols and control symbols. Transmit processor 220 may also generate reference symbols for reference signals (e.g., the CRS) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to certain aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive (RX) processor 258 may process (e.g., demodulate and decode) the detected symbols, provide decoded data for UE 120 to a data sink 260, and provide decoded control information and system information to a controller/processor 280. A channel processor may determine RSRP, RSSI, RSRQ, CQI, and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform waveform signaling for downlink communications. For example, controller/processor 240 of base station 110, controller/processor 280 of UE 120, and/or any other component(s) of FIG. 2 may perform or direct operations of, for example, method 1100 of FIG. 11, method 1200 of FIG. 12, method 1300 of FIG. 13, and/or other processes as described herein. Memories 242 and 282 may store data and program codes for BS 110 and UE 120, respectively. A scheduler 246 may schedule UEs for data transmission on the downlink and/or uplink.

As indicated above, FIG. 2 is provided merely as an example. Other examples are possible and may differ from what was described with regard to FIG. 2.

Figure 3:
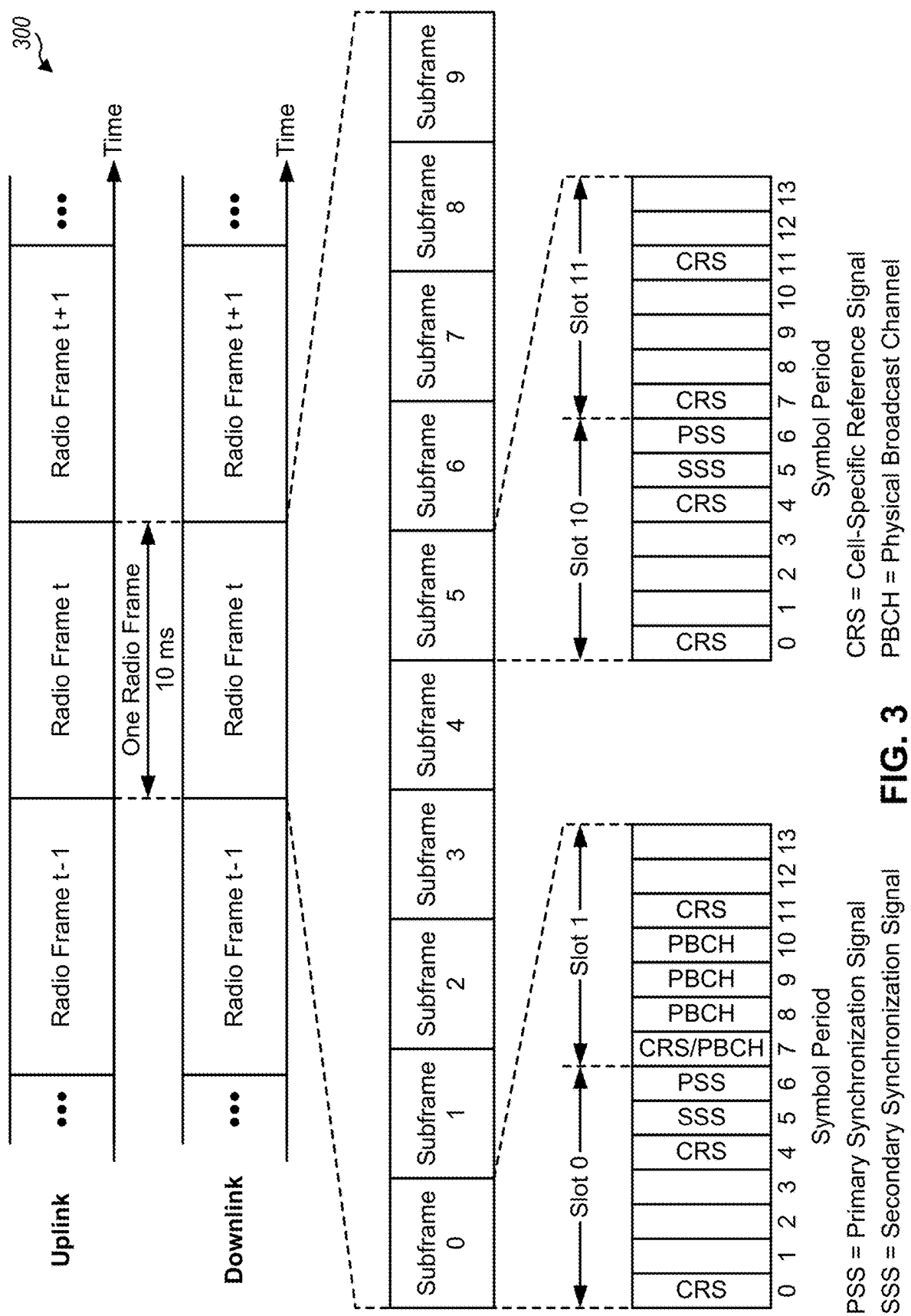
FIG. 3 is a diagram illustrating an example of a frame structure in a wireless communication network.

FIG. 3 shows an example frame structure 300 for FDD in a telecommunications system (e.g., LTE). The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 3) or six symbol periods for an extended cyclic prefix. The 2L symbol periods in each subframe may be assigned indices of 0 through 2L−1.

While some techniques are described herein in connection with frames, subframes, slots, and/or the like, these techniques may equally apply to other types of wireless communication structures, which may be referred to using terms other than "frame," "subframe," "slot," and/or the like in 5G. In some aspects, a wireless communication structure may refer to a periodic time-bounded communication unit defined by a wireless communication standard and/or protocol.

In certain telecommunications (e.g., LTE), a BS may transmit a primary synchronization signal (PSS) and a secondary synchronization signal (SSS) on the downlink in the center of the system bandwidth for each cell supported by the BS. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The BS may transmit a cell-specific reference signal (CRS) across the system bandwidth for each cell supported by the BS. The CRS may be transmitted in certain symbol periods of each subframe and may be used by the UEs to perform channel estimation, channel quality measurement, and/or other functions. The BS may also transmit a physical broadcast channel (PBCH) in symbol periods 0 to 3 in slot 1 of certain radio frames. The PBCH may carry some system information. The BS may transmit other system information such as system information blocks (SIBs) on a physical downlink shared channel (PDSCH) in certain subframes. The BS may transmit control information/data on a physical downlink control channel (PDCCH) in the first B symbol periods of a subframe, where B may be configurable for each subframe. The BS may transmit traffic data and/or other data on the PDSCH in the remaining symbol periods of each subframe. In some aspects, one or more of these signals and/or channels may carry a waveform indication for another signal and/or channel, as described in more detail elsewhere herein.

In other systems (e.g., such as 5G systems), a Node B may transmit these or other signals in these locations or in different locations of the subframe.

As indicated above, FIG. 3 is provided merely as an example. Other examples are possible and may differ from what was described with regard to FIG. 3.

Figure 4:
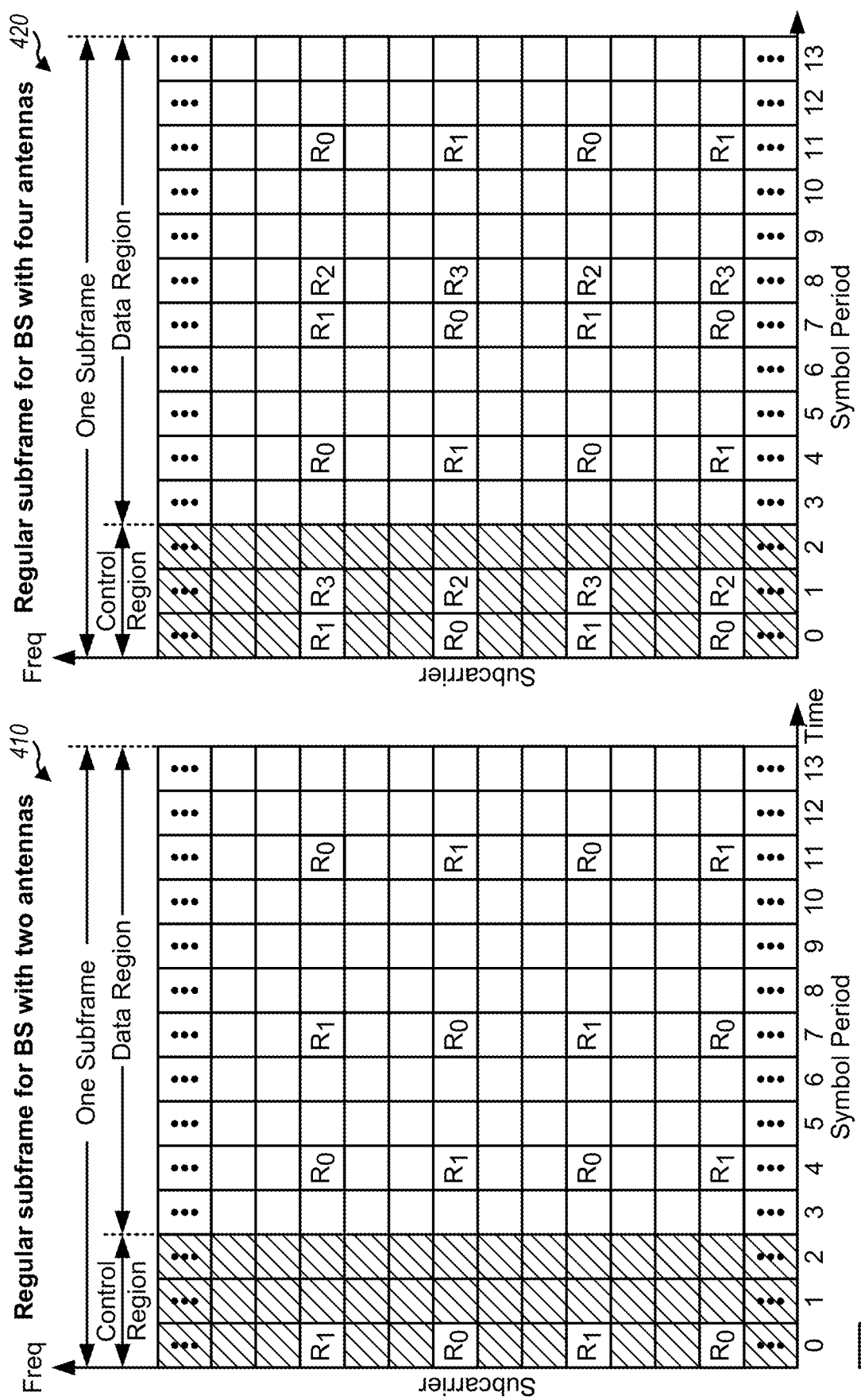
FIG. 4 is a diagram illustrating two example subframe formats with the normal cyclic prefix.

FIG. 4 shows two example subframe formats 410 and 420 with the normal cyclic prefix. The available time frequency resources may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for two antennas. A CRS may be transmitted from antennas 0 and 1 in symbol periods 0, 4, 7 and 11. A reference signal is a signal that is known a priori by a transmitter and a receiver and may also be referred to as pilot. A CRS is a reference signal that is specific for a cell, e.g., generated based at least in part on a cell identity (ID). In FIG. 4, for a given resource element with label Ra, a modulation symbol may be transmitted on that resource element from antenna a, and no modulation symbols may be transmitted on that resource element from other antennas. Subframe format 420 may be used with four antennas. A CRS may be transmitted from antennas 0 and 1 in symbol periods 0, 4, 7 and 11 and from antennas 2 and 3 in symbol periods 1 and 8. For both subframe formats 410 and 420, a CRS may be transmitted on evenly spaced subcarriers, which may be determined based at least in part on cell ID. CRSs may be transmitted on the same or different subcarriers, depending on their cell IDs. For both subframe formats 410 and 420, resource elements not used for the CRS may be used to transmit data (e.g., traffic data, control data, and/or other data).

The PSS, SSS, CRS and PBCH in LTE are described in 3GPP TS 36.211, entitled "Evolved Universal Terrestrial Radio Access (E-UTRA); Physical Channels and Modulation," which is publicly available.

An interlace structure may be used for each of the downlink and uplink for FDD in certain telecommunications systems (e.g., LTE). For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, and/or the like, where q∈{0, ... , Q−1}.

The wireless network may support hybrid automatic retransmission request (HARQ) for data transmission on the downlink and uplink. For HARQ, a transmitter (e.g., a BS) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with LTE technologies, aspects of the present disclosure may be applicable with other wireless communication systems, such as 5G technologies.

5G may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, 5G may utilize OFDM with a CP (herein referred to as cyclic prefix OFDM or CP-OFDM) and/or SC-1-DM on the uplink, may utilize CP-OFDM on the downlink and include support for half-duplex operation using TDD. In aspects, 5G may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. 5G may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service. In some aspects, DFT-s-OFDM, CP-OFDM, and/or the like may be used on the downlink, and a BS may signal a type of waveform to be used for downlink communication to a UE, as described in more detail elsewhere herein.

A single component carrier bandwidth of 100 MHZ may be supported. 5G resource blocks may span 12 sub-carriers with a sub-carrier bandwidth of 75 kilohertz (kHz) over a 0.1 ms duration. Each radio frame may include 50 subframes with a length of 10 ms. Consequently, each subframe may have a length of 0.2 ms. Each subframe may indicate a link direction (e.g., DL or UL) for data transmission and the link direction for each subframe may be dynamically switched. Each subframe may include DL/UL data as well as DL/UL control data. UL and DL subframes for 5G may be as described in more detail below with respect to FIGS. 7 and 8.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, 5G may support a different air interface, other than an OFDM-based interface. 5G networks may include entities such central units or distributed units.

The RAN may include a central unit (CU) and distributed units (DUs). A 5G BS (e.g., gNB, 5G Node B, Node B, transmit receive point (TRP), access point (AP)) may correspond to one or multiple BSs. 5G cells can be configured as access cells (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases, DCells may not transmit synchronization signals—in some case cases DCells may transmit SS. 5G BSs may transmit downlink signals to UEs indicating the cell type. Based at least in part on the cell type indication, the UE may communicate with the 5G BS. For example, the UE may determine 5G BSs to consider for cell selection, access, handover, and/or measurement based at least in part on the indicated cell type.

As indicated above, FIG. 4 is provided merely as an example. Other examples are possible and may differ from what was described with regard to FIG. 4.

Figure 5:
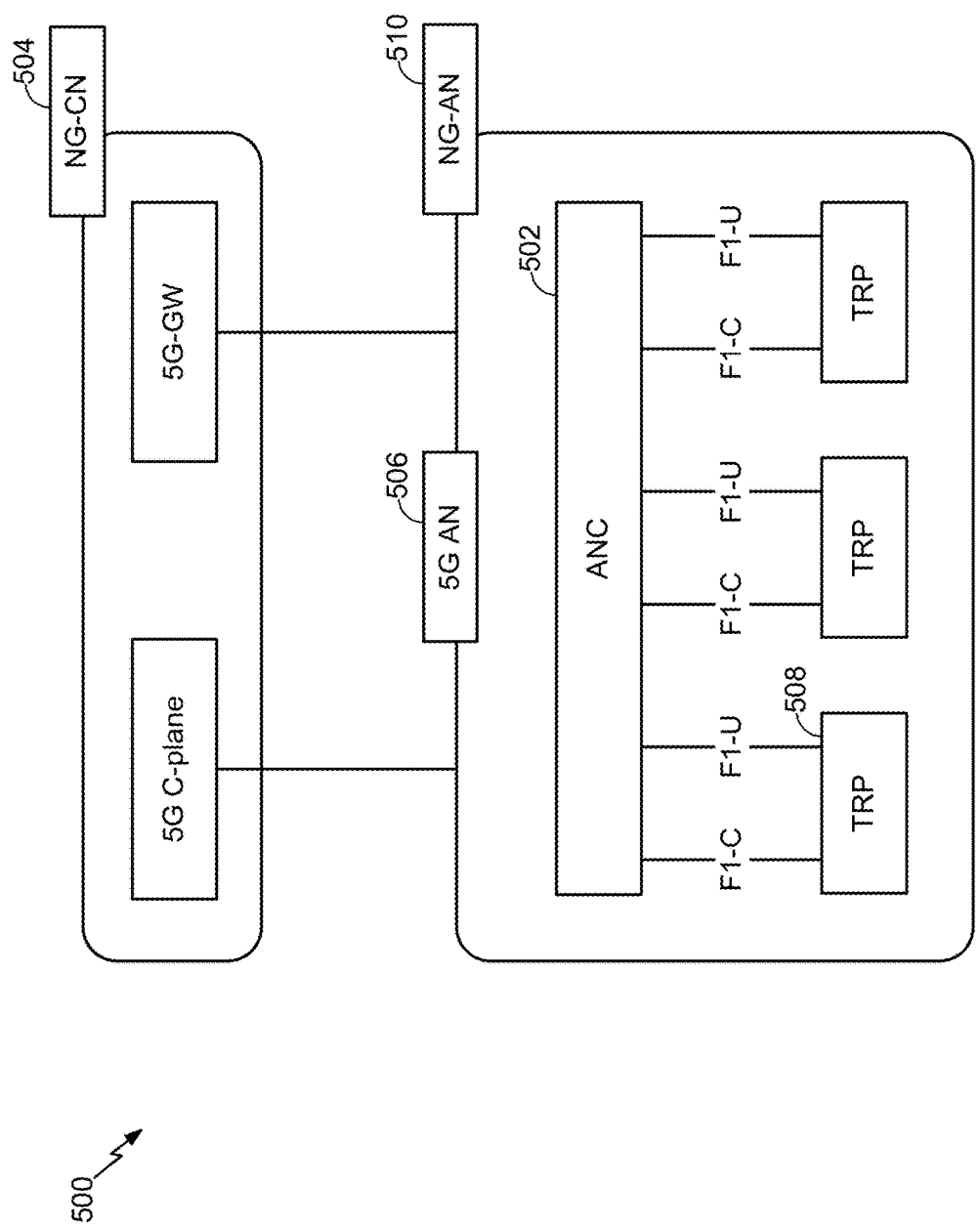
FIG. 5 is a diagram illustrating an example logical architecture of a distributed radio access network (RAN).

FIG. 5 illustrates an example logical architecture of a distributed RAN 500, according to aspects of the present disclosure. A 5G access node 506 may include an access node controller (ANC) 502. The ANC may be a central unit (CU) of the distributed RAN 500. The backhaul interface to the next generation core network (NG-CN) 504 may terminate at the ANC. The backhaul interface to neighboring next generation access nodes (NG-ANs) may terminate at the ANC. The ANC may include one or more TRPs 508 (which may also be referred to as BSs, 5G BSs, Node Bs, 5G NBs, APs, gNB, or some other term). As described above, a TRP may be used interchangeably with "cell."

The TRPs 508 may be a distributed unit (DU). The TRPs may be connected to one ANC (ANC 502) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE. In some aspects, a TRP 508 may use waveform signaling for downlink communications to notify a UE of a type of waveform being used for a downlink communication, thereby conserving UE resources that would otherwise be wasted attempting to process the downlink communication using multiple types of waveforms.

The local architecture of RAN 500 may be used to illustrate fronthaul definition. The architecture may be defined that support fronthauling solutions across different deployment types. For example, the architecture may be based at least in part on transmit network capabilities (e.g., bandwidth, latency, and/or jitter).

The architecture may share features and/or components with LTE. According to aspects, the next generation AN (NG-AN) 510 may support dual connectivity with 5G. The NG-AN may share a common fronthaul for LTE and 5G.

The architecture may enable cooperation between and among TRPs 508. For example, cooperation may be preset within a TRP and/or across TRPs via the ANC 502. According to aspects, no inter-TRP interface may be needed/present.

According to aspects, a dynamic configuration of split logical functions may be present within the architecture of RAN 500. The PDCP, RLC, MAC protocol may be adaptably placed at the ANC or TRP.

According to certain aspects, a BS may include a central unit (CU) (e.g., ANC 502) and/or one or more distributed units (e.g., one or more TRPs 508).

As indicated above, FIG. 5 is provided merely as an example. Other examples are possible and may differ from what was described with regard to FIG. 5.

Figure 6:
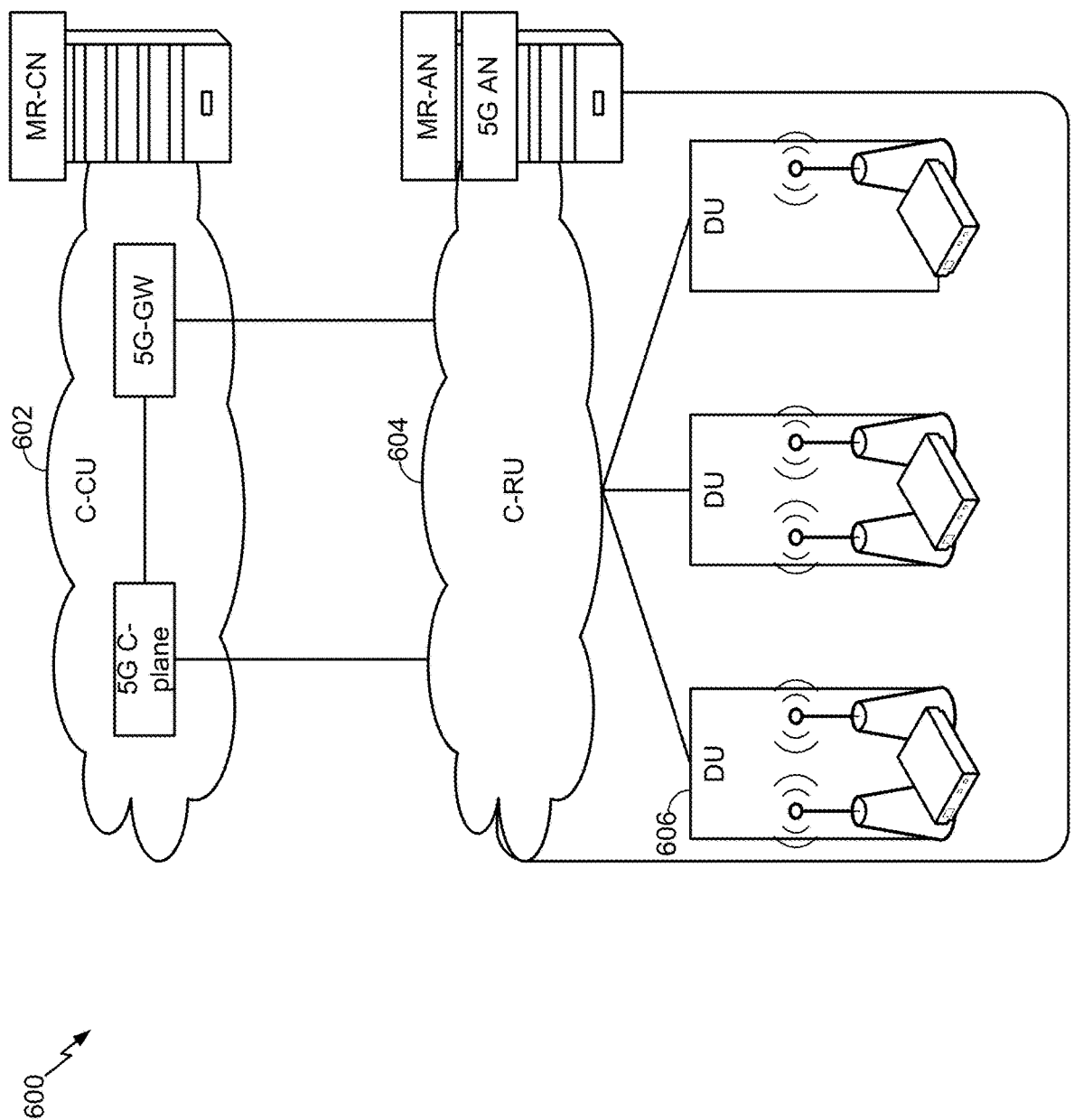
FIG. 6 is a diagram illustrating an example physical architecture of a distributed RAN.

FIG. 6 illustrates an example physical architecture of a distributed RAN 600, according to aspects of the present disclosure. A centralized core network unit (C-CU) 602 may host core network functions. The C-CU may be centrally deployed. C-CU functionality may be offloaded (e.g., to advanced wireless services (AWS)), in an effort to handle peak capacity.

A centralized RAN unit (C-RU) 604 may host one or more ANC functions. Optionally, the C-RU may host core network functions locally. The C-RU may have distributed deployment. The C-RU may be closer to the network edge.

A distributed unit (DU) 606 may host one or more TRPs. The DU may be located at edges of the network with radio frequency (RF) functionality.

As indicated above, FIG. 6 is provided merely as an example. Other examples are possible and may differ from what was described with regard to FIG. 6.

Figure 7:
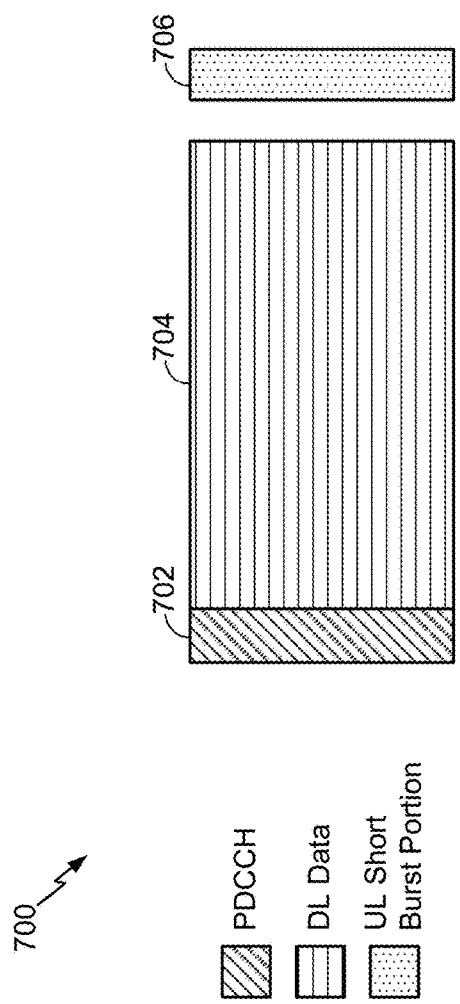
FIG. 7 is a diagram illustrating an example of a downlink (DL)-centric wireless communication structure.

FIG. 7 is a diagram 700 showing an example of a DL-centric subframe or wireless communication structure. The DL-centric subframe may include a control portion 702. The control portion 702 may exist in the initial or beginning portion of the DL-centric subframe. The control portion 702 may include various scheduling information and/or control information corresponding to various portions of the DL-centric subframe. In some configurations, the control portion 702 may be a physical DL control channel (PDCCH), as indicated in FIG. 7.

The DL-centric subframe may also include a DL data portion 704. The DL data portion 704 may sometimes be referred to as the payload of the DL-centric subframe. The DL data portion 704 may include the communication resources utilized to communicate DL data from the scheduling entity (e.g., UE or BS) to the subordinate entity (e.g., UE). In some configurations, the DL data portion 704 may be a physical DL shared channel (PDSCH). In some aspects, a waveform indication for the PDSCH may be carried in the PDCCH, as described in more detail elsewhere herein.

The DL-centric subframe may also include an UL short burst portion 706. The UL short burst portion 706 may sometimes be referred to as an UL burst, an UL burst portion, a common UL burst, a short burst, an UL short burst, a common UL short burst, a common UL short burst portion, and/or various other suitable terms. In some aspects, the UL short burst portion 706 may include one or more reference signals. Additionally, or alternatively, the UL short burst portion 706 may include feedback information corresponding to various other portions of the DL-centric subframe. For example, the UL short burst portion 706 may include feedback information corresponding to the control portion 702 and/or the DL data portion 704. Non-limiting examples of information that may be included in the UL short burst portion 706 include an ACK signal (e.g., a PUCCH ACK, a PUSCH ACK, an immediate ACK), a NACK signal (e.g., a PUCCH NACK, a PUSCH NACK, an immediate NACK), a scheduling request (SR), a buffer status report (BSR), a HARQ indicator, a channel state indication (CSI), a channel quality indicator (CQI), a sounding reference signal (SRS), a demodulation reference signal (DMRS), PUSCH data, and/or various other suitable types of information. The UL short burst portion 706 may include additional or alternative information, such as information pertaining to random access channel (RACH) procedures, scheduling requests, and various other suitable types of information.

As illustrated in FIG. 7, the end of the DL data portion 704 may be separated in time from the beginning of the UL short burst portion 706. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). The foregoing is merely one example of a DL-centric wireless communication structure, and alternative structures having similar features may exist without necessarily deviating from the aspects described herein.

As indicated above, FIG. 7 is provided merely as an example. Other examples are possible and may differ from what was described with regard to FIG. 7.

Figure 8:
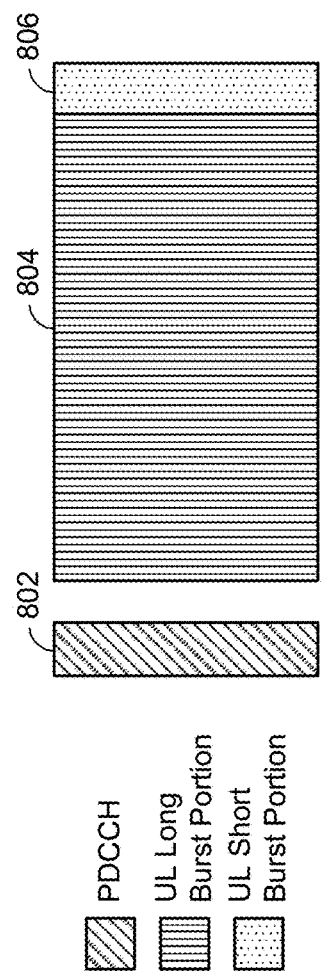
FIG. 8 is a diagram illustrating an example of an uplink (UL)-centric wireless communication structure.

FIG. 8 is a diagram 800 showing an example of an UL-centric subframe or wireless communication structure. The UL-centric subframe may include a control portion 802. The control portion 802 may exist in the initial or beginning portion of the UL-centric subframe. The control portion 802 in FIG. 8 may be similar to the control portion 702 described above with reference to FIG. 7. In some configurations, the control portion 802 may be a physical DL control channel (PDCCH). In some aspects, the PDCCH may carry a waveform indication for another downlink channel, as described in more detail elsewhere herein.

The UL-centric subframe may also include an UL long burst portion 804. The UL long burst portion 804 may sometimes be referred to as the payload of the UL-centric subframe. The UL portion may refer to the communication resources utilized to communicate UL data from the subordinate entity (e.g., UE) to the scheduling entity (e.g., UE or BS).

As illustrated in FIG. 8, the end of the control portion 802 may be separated in time from the beginning of the UL long burst portion 804. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity).

The UL-centric subframe may also include an UL short burst portion 806. The UL short burst portion 806 in FIG. 8 may be similar to the UL short burst portion 706 described above with reference to FIG. 7, and may include any of the information described above in connection with FIG. 7. The foregoing is merely one example of an UL-centric wireless communication structure and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

In one example, a wireless communication structure, such as a frame, may include both UL-centric subframes and DL-centric subframes. In this example, the ratio of UL-centric subframes to DL-centric subframes in a frame may be dynamically adjusted based at least in part on the amount of UL data and the amount of DL data that are transmitted. For example, if there is more UL data, then the ratio of UL-centric subframes to DL-centric subframes may be increased. Conversely, if there is more DL data, then the ratio of UL-centric subframes to DL-centric subframes may be decreased.

As indicated above, FIG. 8 is provided merely as an example. Other examples are possible and may differ from what was described with regard to FIG. 8.

In 5G, different types of waveforms may be used for uplink and/or downlink communications. For example, such communications may be transmitted and/or received using a DFT-s-OFDM waveform, a CP-OFDM waveform, and/or the like, depending on one or more factors, such as a network condition, a performance parameter, a type of communication being transmitted, and/or the like. For example, a DFT-s-OFDM waveform may be used to achieve performance benefits associated with a lower peak to average power ratio (PAPR), a CP-OFDM waveform may be used to achieve performance benefits associated with a higher spectral efficiency, and/or the like.

When a base station is capable of using multiple different types of waveforms for a downlink communication to a UE, the UE may waste processing resources attempting to receive and/or process the downlink communication. For example, the UE may cycle through various possible types of waveforms in an attempt to process the downlink communication. Techniques described herein use waveform signaling for downlink communications to notify the UE of a type of waveform being used for a downlink communication, thereby conserving UE resources (e.g., processing resources, memory resources, RF resources, and/or the like) that would otherwise be wasted attempting to process the downlink communication using multiple types of waveforms.

Figure 9:
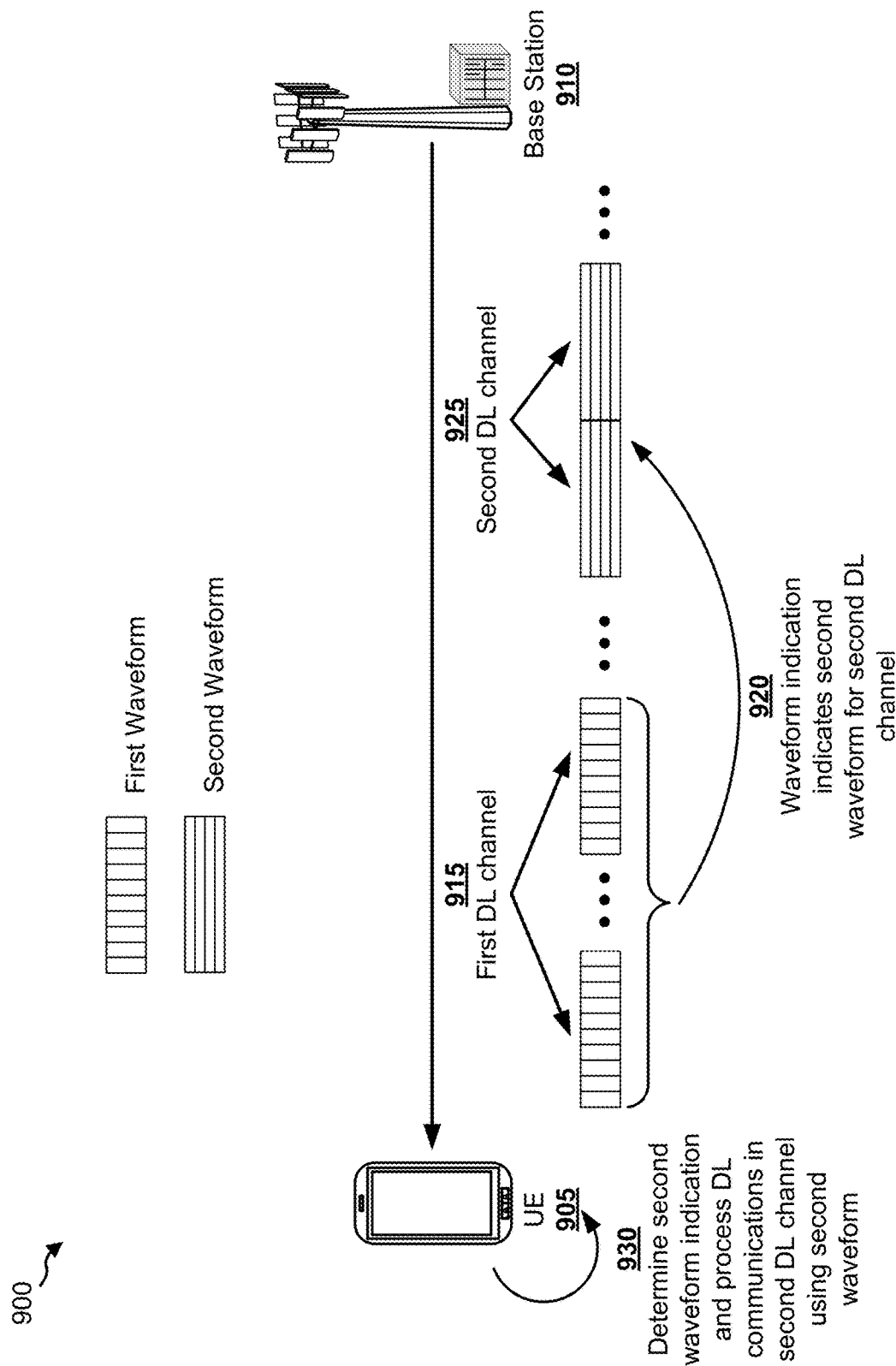
FIG. 9 is a diagram illustrating an example of waveform signaling for downlink communications.

FIG. 9 is a diagram illustrating an example 900 of waveform signaling for downlink communications. As shown in FIG. 9, a UE 905 may communicate with a base station 910 to receive downlink communications. In some aspects, the UE 905 may correspond to the UE 120 of FIG. 1 and/or one or more other UEs described herein. In some aspects, the base station 910 may correspond to the base station 110 of FIG. 1 and/or one or more other base stations described herein.

As shown by reference number 915, the UE 905 may receive information from the base station 910 in a first downlink channel. The first downlink channel may use a first waveform of a plurality of waveforms. The plurality of waveforms may include, for example, a DFT-s-OFDM waveform, a CP-OFDM waveform, a default waveform (e.g., a fixed waveform used for a particular type of signal and/or channel), and/or the like. In some aspects, the first downlink channel may be a control channel (e.g., a first control channel), a broadcast channel, and/or the like. For example, the first downlink channel may be a channel that carries a primary synchronization signal (PSS), a channel that carries a secondary synchronization signal (SSS), a physical broadcast channel (PBCH), a physical downlink control channel (PDCCH), a portion of the PDCCH (e.g., a first stage of a multi-stage PDCCH), and/or the like.

As shown by reference number 920, the first downlink channel may carry a waveform indication. The waveform indication may indicate a second waveform, of the plurality of waveforms, used for a second downlink channel. The second downlink channel may be a control channel (e.g., a second control channel), a data channel, a unicast channel, a multicast channel, and/or the like. For example, the second downlink channel may be a PBCH, a PDCCH, a portion of the PDCCH (e.g., a second stage of a multi-stage PDCCH), a physical downlink shared channel (PDSCH), and/or the like.

In some aspects, the UE 905 may acquire and/or receive information in the first downlink channel before acquiring and/or receiving information in the second downlink channel. For example, the first downlink channel may be a channel that carries the PSS and/or the SSS, and the second downlink channel may be the PBCH, the PDCCH, a portion of the PDCCH, the PDSCH, and/or the like. Additionally, or alternatively, the first downlink channel may be the PBCH, and the second downlink channel may be the PDCCH, a portion of the PDCCH, the PDSCH, and/or the like. Additionally, or alternatively, the first downlink channel may be the PDCCH, and the second downlink channel may be the PDSCH and/or the like. Additionally, or alternatively, the first downlink channel may be a first portion of the PDCCH, and the second downlink channel may be the PDSCH, a second portion of the PDCCH, and/or the like. In some aspects, the UE 905 may receive information in the first downlink channel and the second downlink channel in the same transmission time interval (e.g., slot, subframe, and/or the like). For example, the first downlink channel may be the control portion 702 of the DL-centric subframe shown in FIG. 7 (e.g., the PDCCH), and the second downlink channel may be the DL data portion 704 of the same DL-centric subframe (e.g., the PDSCH).

The waveform indication may indicate a second waveform to be used for one or more downlink communications in the second downlink channel. In some aspects, the waveform indication includes a waveform identifier that explicitly identifies the second waveform (e.g., using a first set of bits to identify a first type of waveform, a second set of bits to identify a second type of waveform, etc.).

Additionally, or alternatively, the waveform indication may implicitly identify the second waveform. For example, a type of waveform may be associated with one or more configuration parameters, such as a symbol duration, a slot (or subframe, mini-slot, etc.) structure, a bandwidth, a frequency band, a modulation or coding scheme (MCS), and/or the like. In this case, the waveform indication may indicate a symbol duration for the one or more downlink communications, a slot (or subframe, mini-slot, etc.) structure for the one or more downlink communications, a bandwidth for the one or more downlink communications, an MCS for the one or more downlink communications, and/or the like. The UE 905 may use one or more of these configuration parameters, received as the waveform indication, to determine the second waveform to be used for one or more downlink communications in the second downlink channel. For example, the UE 905 may compare a configuration parameter to a condition and/or a threshold, and may determine the second waveform based at least in part on whether the configuration parameter satisfies the condition and/or the threshold.

Additionally, or alternatively, the type of waveform may be associated with a type of transmission, such as a broadcast transmission, a unicast transmission, a multicast transmission, a control channel transmission, a data channel transmission, a transmission between base stations, a transmission between a UE and a base station, and/or the like. In this case, the UE 905 may use the type of transmission, received as the waveform indication, to determine the second waveform.

In some aspects, the UE 905 may use the type of waveform identified in the waveform indication to determine one or more configuration parameters corresponding to the identified type of waveform. For example, the waveform indication may include a waveform identifier, and the UE 905 may use the waveform identifier to determine a symbol duration for the one or more downlink communications, a slot (or subframe, mini-slot, etc.) structure for the one or more downlink communications, a bandwidth for the one or more downlink communications, a frequency band for the one or more downlink communications, an MCS for the one or more downlink communications, and/or the like. Additionally, or alternatively, the waveform indication may identify one or more first configuration parameters that indicate a type of waveform, and the UE 905 may use one or more first configuration parameters and/or the type of waveform to determine one or more second configuration parameters associated with the type of waveform. In some aspects, the waveform indication may narrow the possible choices of configuration parameters (e.g., to one or more configuration parameters that can be used with a waveform), and the configuration parameter to be used may be signaled from the base station 910 to the UE 905 using less overhead (e.g., fewer bits) than if there were more possible choices for the configuration parameters.

As shown by reference number 925, the UE 905 may receive one or more downlink communications in the second downlink channel using the second waveform. In some aspects, the first waveform and the second waveform are different (e.g., are different types of waveforms). For example, the first waveform may be a default waveform, and the second waveform may be a DFT-s-OFDM waveform, a CP-OFDM waveform, and/or the like. In some aspects, the UE 905 may determine the default waveform based at least in part on a frequency band associated with the UE 905 (e.g., a frequency band in which the one or more downlink communications are to be received), a system bandwidth (e.g., signaled in a master information block, a system information block, etc.), and/or the like. In some aspects, the first waveform may be a DFT-s-OFDM waveform, and the second waveform may be a CP-OFDM waveform. In some aspects, the first waveform may be a CP-OFDM waveform, and the second waveform may be a DFT-s-OFDM waveform. In some aspects, the first waveform and the second waveform are the same (e.g., a same type of waveform). In this case, the waveform indication may include a value (e.g., a bit) that indicates that the second waveform is a same type of waveform as the first waveform.

In some aspects, the UE 905 may receive a reference signal or a data tone using pre-DFT spread multiplexing or time division multiplexing (TDM) when the second waveform is the DFT-s-OFDM waveform. Similarly, the UE 905 may receive a reference signal or a data tone using FDM or TDM when the second waveform is the OFDM waveform. In this way, the UE 905 may properly process signals received using a particular type of waveform by using a reference signal and/or a data tone corresponding to the particular type of waveform.

As shown by reference number 930, the UE 905 may determine the second waveform based at least in part on the waveform indication received in the first downlink channel, and may process one or more downlink communications received in the second downlink channel using the second waveform. For example, the UE 905 may process downlink communications differently depending on a type of waveform used to transmit the downlink communications. Thus, by receiving an indication of the waveform used for the downlink communications, the UE 905 may correctly process the downlink communications without attempting to process the downlink communications using multiple types of waveforms, thereby conserving resources of the UE (e.g., processing resources, memory resources, radio resources, and/or the like). Furthermore, the base station 910 may dynamically select a waveform to be used for downlink communications depending on network conditions, traffic requirements, and/or the like, thereby improving usage of network resources.

In some aspects, the UE 905 may process the one or more downlink communications using interference cancellation based at least in part on an indication of a waveform, of the plurality of waveforms, associated with downlink communications of another UE, as described below in connection with FIG. 10.

As indicated above, FIG. 9 is provided as an example. Other examples are possible and may differ from what was described with respect to FIG. 9.

Figure 10:
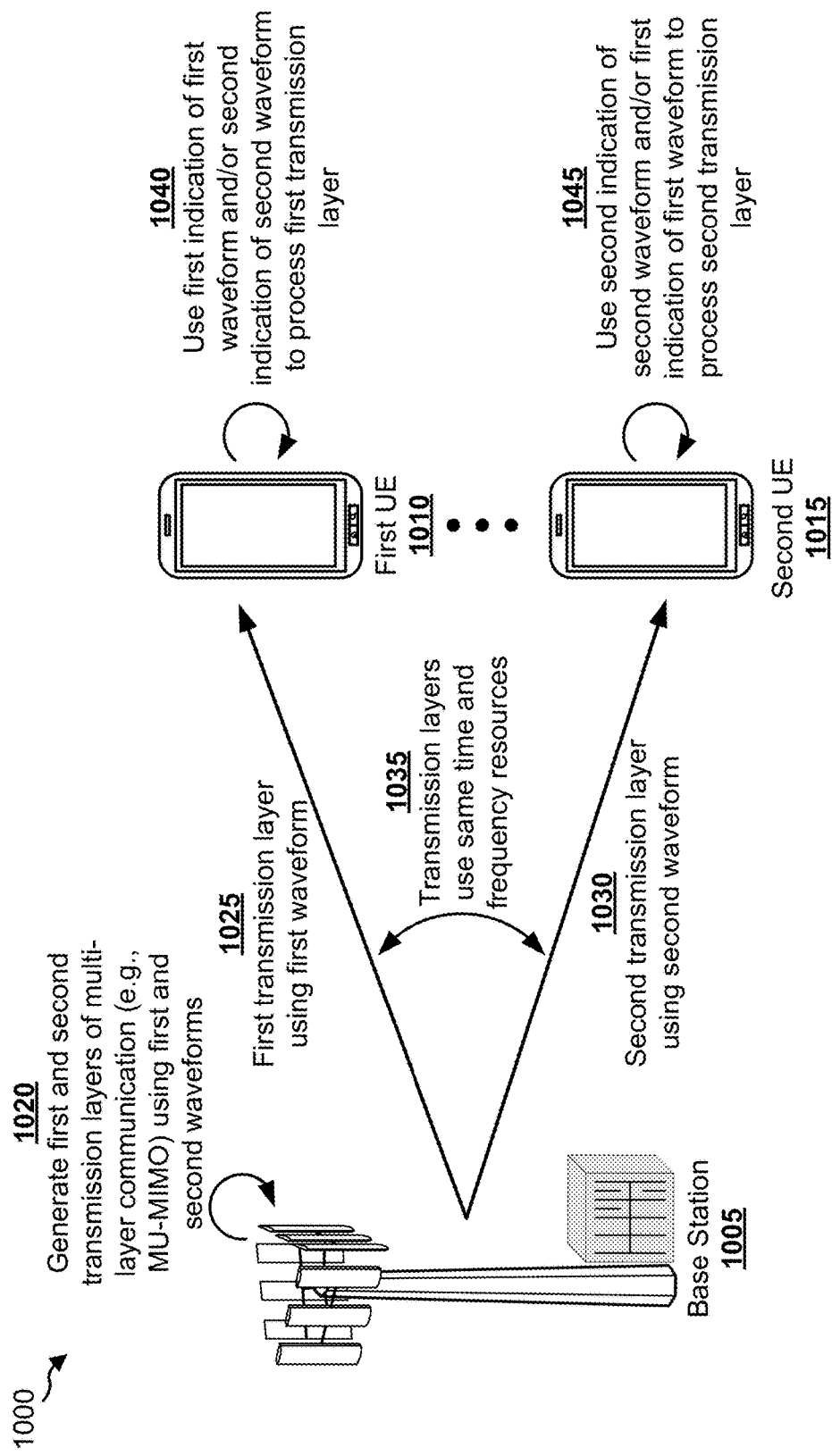
FIG. 10 is a diagram illustrating another example of waveform signaling for downlink communications.

FIG. 10 is a diagram illustrating an example 1000 of waveform signaling for downlink communications. As shown in FIG. 10, a base station 1005 may transmit respective downlink communications to a first UE 1010 and a second UE 1015, and the first UE 1010 and the second UE 1015 may receive the respective downlink communications from the base station 1005. In some aspects, the base station 1005 may correspond to the base station 110 of FIG. 1, the base station 910 of FIG. 9, and/or one or more other base stations described herein. In some aspects, the first UE 1010 may correspond to the UE 120 of FIG. 1, the UE 905 of FIG. 9, and/or one or more other UEs described herein. In some aspects, the second UE 1015 may correspond to the UE 120 of FIG. 1, the UE 905 of FIG. 9, and/or one or more other UEs described herein.

As shown by reference number 1020, the base station 1005 may generate a first transmission layer of a multi-layer communication using a first waveform, of a plurality of waveforms, and may generate a second transmission layer of the multi-layer communication using a second waveform of the plurality of waveforms. In some aspects, the plurality of waveforms include a DFT-s-OFDM waveform, a CP-OFDM waveform, and/or the like. In some aspects, the first waveform and the second waveform may be different. For example, the base station 1005 may generate the first transmission layer using a DFT-s-OFDM waveform, and may generate the second transmission layer using a CP-OFDM waveform, or vice versa.

The multi-layer communication may include multiple transmissions that are transmitted using a same time resource (e.g., simultaneously or concurrently) and a same frequency resource. For example, the multi-layer communication may include a MIMO communication, such as a multi-user MIMO (MU-MIMO) communication, a multi-user superposition transmission (MUST), a downlink version of a non-orthogonal multiple access (NOMA) communication, and/or the like.

As shown by reference numbers 1025 and 1030, the base station 1005 may transmit the first transmission on a first layer (e.g., a first layer of information, a first transmission layer, etc.) to the first UE 1010 using the first waveform, and may transmit the second transmission (e.g., a second layer of information, a second transmission layer, etc.) on the second layer to the second UE 1015 using the second waveform. In some aspects, the base station 1005 may transmit the first transmission on the first layer and the second transmission on the second layer using different antenna beams (e.g., using beamforming, precoding, and/or the like).

As shown by reference number 1035, the base station 1005 may transmit the first transmission on the first layer and the second transmission on the second layer using a same time resource and a same frequency resource (e.g., using MU-MIMO). For example, the base station 1005 may transmit the first transmission and the second transmission simultaneously using two transmission layers over the same frequency.

As shown by reference number 1040, the first UE 1010 may receive a first indication of the first waveform used for the first transmission layer, and may use the first indication to process the first transmission layer (e.g., to process one or more first downlink communications included in the first transmission layer). For example, the base station 1005 may transmit the first indication (e.g., a waveform indication) to the first UE 1010, and the first indication may indicate the first waveform used for the first transmission layer. The first indication may indicate the first waveform according to any of the techniques described above in connection with FIG. 9. For example, the first indication may include a waveform identifier that identifies the first waveform, may identify one or more configuration parameters that correspond to the first waveform, and/or the like. Additionally, or alternatively, the first indication may include a layer identifier associated with a MU-MIMO communication, and the layer identifier may correspond to a waveform. In this case, the first UE 1010 may use the layer identifier to determine the first waveform. In some aspects, the first UE 1010 may receive the first indication in a similar manner as the waveform indication, as is described above in connection with FIG. 9.

Additionally, or alternatively, the first UE 1010 may receive a second indication of the second waveform used for the second transmission layer, and may use the second indication to process the first transmission layer. For example, the base station 1005 may transmit the second indication (e.g., a waveform indication) to the first UE 1010, and the second indication may indicate the second waveform used for the second transmission layer. The first UE 1010 may use the second indication of the second waveform to perform interference cancellation. In this way, the first UE 1010 may improve processing of the first transmission layer to correctly receive the first transmission layer, thereby conserving network resources by reducing retransmissions.

As shown by reference number 1045, the second UE 1015 may receive a second indication of the second waveform used for the second transmission layer, and may use the second indication to process the second transmission layer (e.g., to process one or more second downlink communications included in the second transmission layer). For example, the base station 1005 may transmit the second indication (e.g., a waveform indication) to the second UE 1015, and the second indication may indicate the second waveform used for the second transmission layer. The second indication may indicate the second waveform according to any of the techniques described above in connection with FIG. 9. For example, the second indication may include a waveform identifier that identifies the second waveform, may identify one or more configuration parameters that correspond to the second waveform, and/or the like. Additionally, or alternatively, the second indication may include a layer identifier associated with a MU-MIMO communication, and the layer identifier may correspond to a waveform. In this case, the second UE 1015 may use the layer identifier to determine the second waveform. In some aspects, the second UE 1015 may receive the second indication in a similar manner as the waveform indication, as is described above in connection with FIG. 9.

Additionally, or alternatively, the second UE 1015 may receive a first indication of the first waveform used for the first transmission layer, and may use the first indication to process the second transmission layer. For example, the base station 1005 may transmit the first indication (e.g., a waveform indication) to the second UE 1015, and the first indication may indicate the first waveform used for the first transmission layer. The second UE 1015 may use the first indication of the first waveform to perform interference cancellation. In this way, the second UE 1015 may improve processing of the second transmission layer to correctly receive the second transmission layer, thereby conserving network resources by reducing retransmissions.

As indicated above, FIG. 10 is provided as an example. Other examples are possible and may differ from what was described with respect to FIG. 10.

Figure 11:
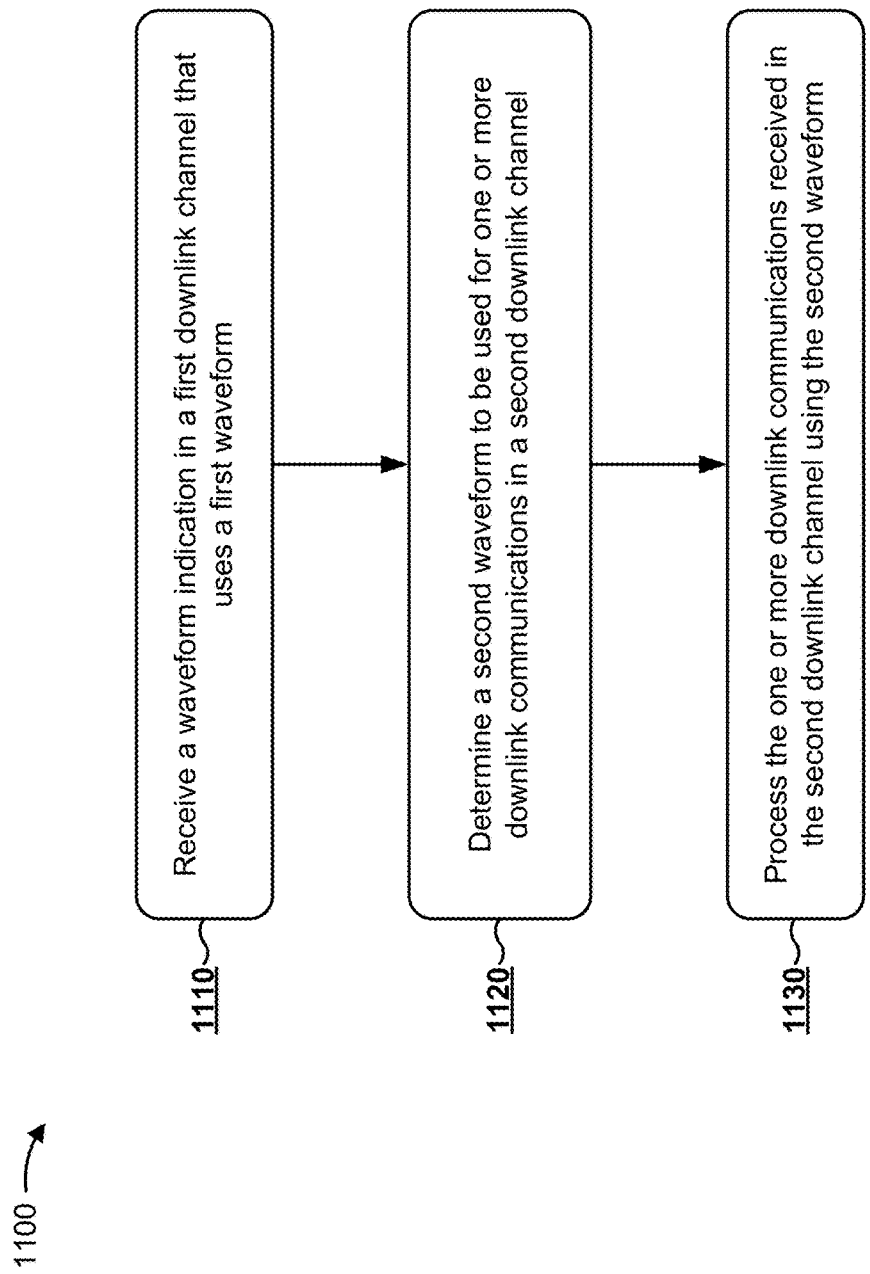
FIG. 11 is a flow chart of a method of wireless communication.

FIG. 11 is a flow chart of a method 1100 of wireless communication. The method may be performed by a UE (e.g., the UE 120 of FIG. 1, the UE 905 of FIG. 9, the first UE 1010 of FIG. 10, the second UE 1015 of FIG. 10, the apparatus 1402 and/or 1402' of FIGS. 14 and/or 15, and/or the like).

At 1110, the UE may receive a waveform indication in a first downlink channel that uses a first waveform. For example, the UE may receive a waveform indication in a first downlink channel that uses a first waveform of a plurality of waveforms, as described above in connection with FIG. 9. In some aspects, the first downlink channel is at least one of: a first control channel, or a broadcast channel. In some aspects, the first waveform is a default waveform used for the first downlink channel. In some aspects, the default waveform is determined based at least in part on: a frequency band associated with the one or more downlink communications, a system bandwidth, or some combination thereof.

In some aspects, the plurality of waveforms include a DFT-s-OFDM waveform and a CP-OFDM waveform. In some aspects, at least one of a reference signal or a data tone is received using pre-DFT spread multiplexing or time division multiplexing when the second waveform is the DFT-s-OFDM waveform, or at least one of a reference signal or a data tone is received using FDM or time division multiplexing when the second waveform is the CP-OFDM waveform.

At 1120, the UE may determine a second waveform to be used for one or more downlink communications in a second downlink channel. For example, the UE may determine a second waveform, of the plurality of waveforms, to be used for one or more downlink communications in a second downlink channel based at least in part on the waveform indication received in the first downlink channel, as described above in connection with FIG. 9. In some aspects, the second downlink channel is at least one of: a second control channel, a data channel, a unicast channel, or a multicast channel. In some aspects, the first waveform and the second waveform are different. In some aspects, the first waveform and the second waveform are the same.

In some aspects, the waveform indication indicates a waveform identifier that explicitly identifies the second waveform. In some aspects, the waveform indication includes one or more configuration parameters that implicitly identify the second waveform. In some aspects, the one or more configuration parameters include one or more of: a symbol duration for the one or more downlink communications, a slot structure for the one or more downlink communications, a bandwidth for the one or more downlink communications, a frequency band for the one or more downlink communications, a modulation or coding scheme for the one or more downlink communications, or some combination thereof. For example, in some aspects, pi/2 BPSK modulation may always be associated with the use of DFT-s-OFDM.

In some aspects, the UE may determine, based at least in part on the waveform indication, one or more configuration parameters associated with the one or more downlink communications. In some aspects, the one or more configuration parameters include one or more of: a symbol duration for the one or more downlink communications, a slot structure for the one or more downlink communications, a bandwidth for the one or more downlink communications, a frequency band for the one or more downlink communications a modulation or coding scheme for the one or more downlink communications, or some combination thereof.

At 1130, the UE may process the one or more downlink communications received in the second downlink channel using the second waveform. For example, the UE may receive the one or more downlink communications in the second downlink channel, and may process the one or more downlink communications using the second waveform, as described above in connection with FIG. 9. In some aspects, the waveform indication and the one or more downlink communications are received in a same transmission time interval. In some aspects, the UE may process the one or more downlink communications using interference cancellation based at least in part on an indication of a waveform, of the plurality of waveforms, associated with downlink communications of another UE, as described above in connection with FIG. 10.

Although FIG. 11 shows example blocks of a method of wireless communication, in some aspects, the method may include additional blocks, fewer blocks, different blocks, or differently arranged blocks than those shown in FIG. 11. Additionally, or alternatively, two or more blocks shown in FIG. 11 may be performed in parallel.

Figure 12:
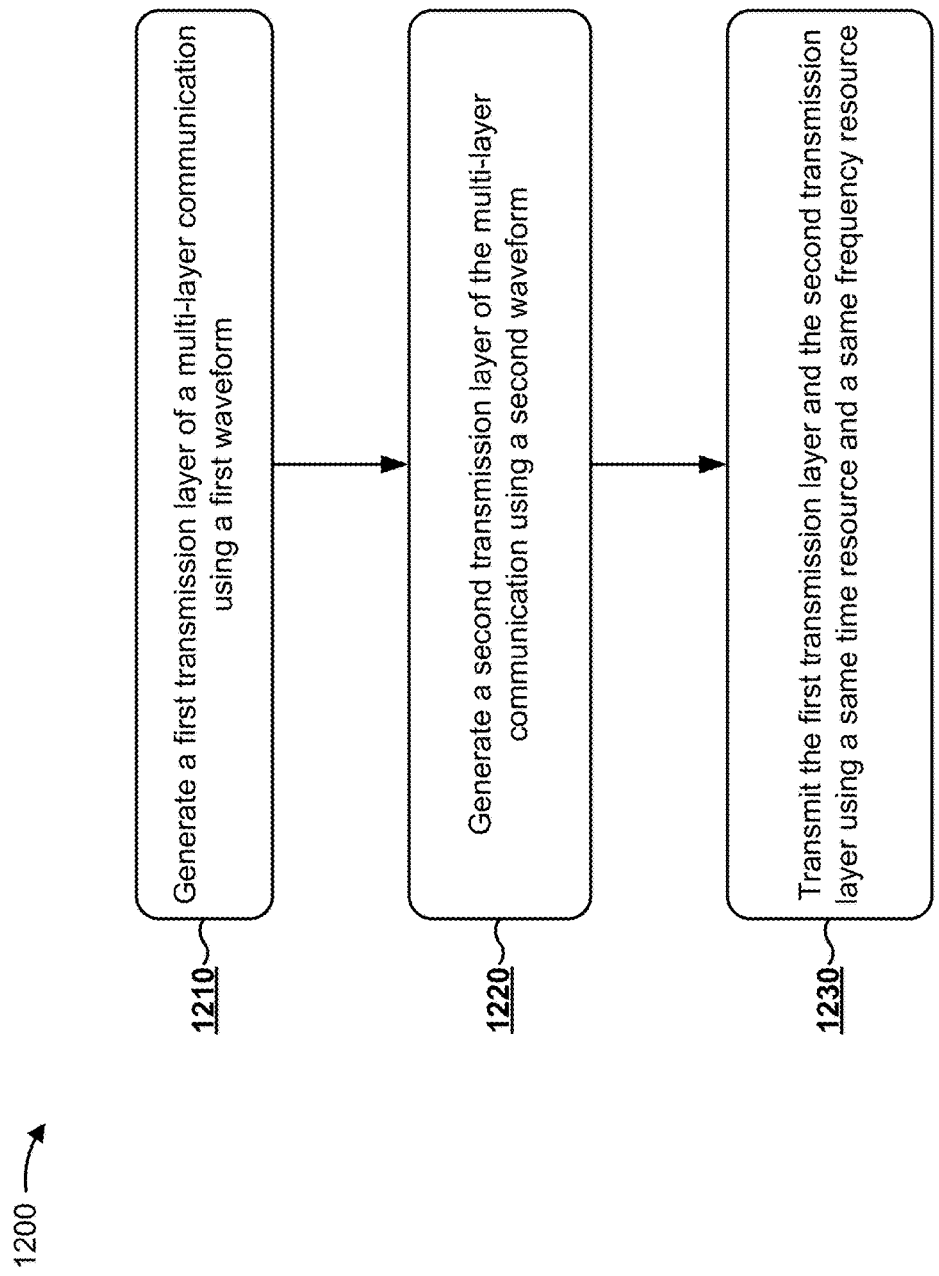
FIG. 12 is a flow chart of another method of wireless communication.

FIG. 12 is a flow chart of a method 1200 of wireless communication. The method may be performed by a base station (e.g., the base station 110 of FIG. 1, the base station 910 of FIG. 9, the base station 1005 of FIG. 10, the apparatus 1602 and/or 1602' of FIGS. 16 and/or 17, and/or the like).

At 1210, the base station may generate a first transmission layer of a multi-layer communication using a first waveform. For example, the base station may generate a first transmission layer of a multi-layer communication using a first waveform of a plurality of waveforms, as described above in connection with FIG. 10. In some aspects, the multi-layer communication is a MU-MIMO communication. In some aspects, the plurality of waveforms include a DFT-s-OFDM waveform and a CP-OFDM waveform. In some aspects, generating the first transmission layer may include generating, encoding, modulating, mapping, etc. first information to be included in the first transmission layer.

At 1220, the base station may generate a second transmission layer of the multi-layer communication using a second waveform. For example, the base station may generate a second transmission layer of the multi-layer communication using a second waveform of the plurality of waveforms, as described above in connection with FIG. 10. In some aspects, the first waveform and the second waveform are different. In some aspects, generating the second transmission layer may include generating, encoding, modulating, mapping, etc. second information to be included in the second transmission layer.

At 1230, the base station may transmit the first transmission layer and the second transmission layer using a same time resource and a same frequency resource. For example, the base station may transmit the first transmission layer and the second transmission layer using a same time resource and a same frequency resource, wherein the first transmission layer is transmitted using the first waveform and the second transmission layer is transmitted using the second waveform, as described above in connection with FIG. 10. In some aspects, the first transmission layer is transmitted to a first UE and the second transmission layer is transmitted to a second UE. In some aspects, the first transmission layer and the second transmission layer are transmitted using different antenna beams of the base station. In some aspects, the base station may transmit at least one of: an indication of the first waveform to the second UE, or an indication of the second waveform to the first UE.

Although FIG. 12 shows example blocks of a method of wireless communication, in some aspects, the method may include additional blocks, fewer blocks, different blocks, or differently arranged blocks than those shown in FIG. 12. Additionally, or alternatively, two or more blocks shown in FIG. 12 may be performed in parallel.

Figure 13:
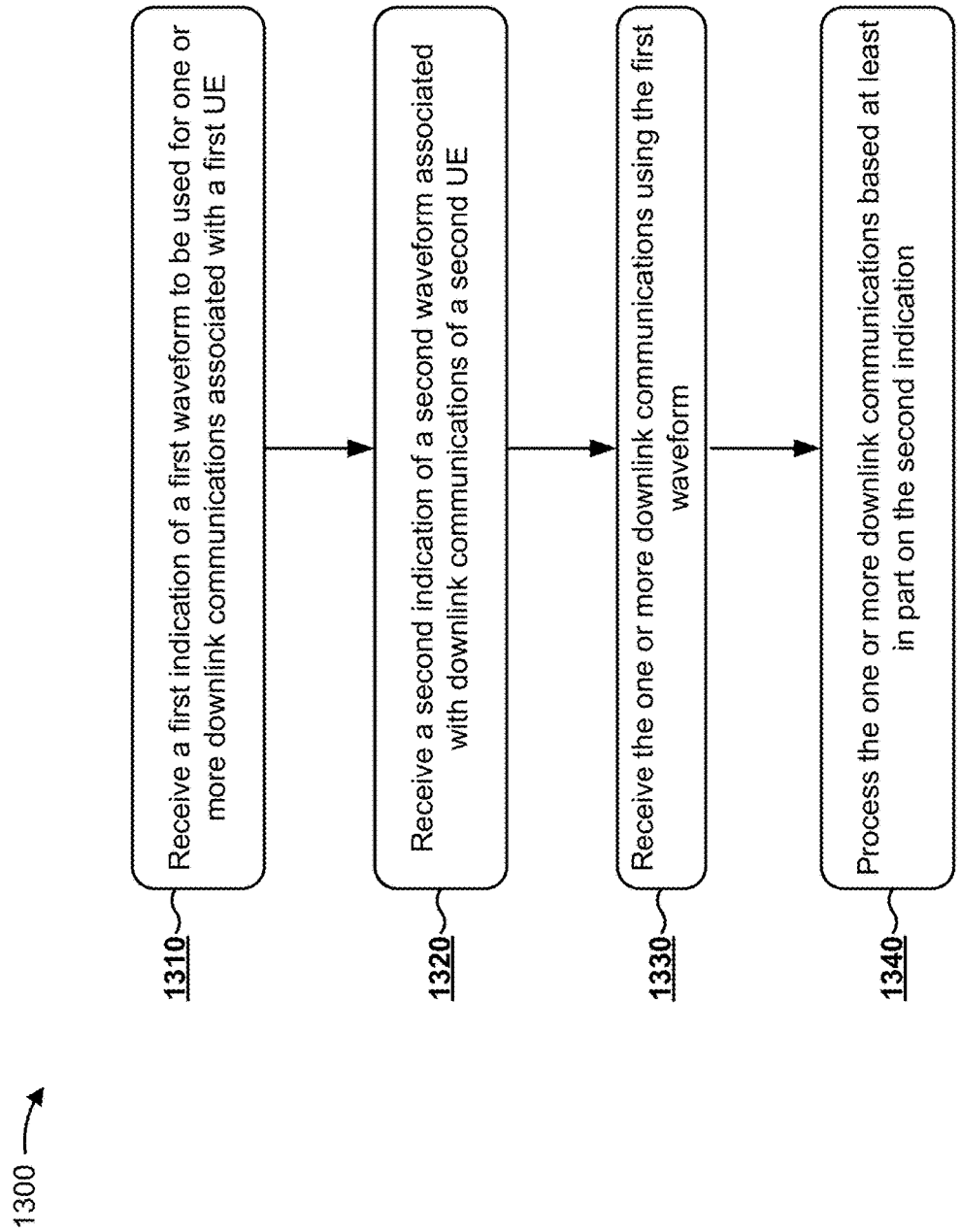
FIG. 13 is a flow chart of another method of wireless communication.

FIG. 13 is a flow chart of a method 1300 of wireless communication. The method may be performed by a UE (e.g., the UE 120 of FIG. 1, the UE 905 of FIG. 9, the first UE 1010 of FIG. 10, the second UE 1015 of FIG. 10, the apparatus 1402 and/or 1402' of FIGS. 14 and/or 15, and/or the like).

At 1310, the UE may receive a first indication of a first waveform to be used for one or more downlink communications associated with a first UE. For example, a first UE may receive a first indication of a first waveform, of a plurality of waveforms, to be used for one or more downlink communications associated with the first UE, as described above in connection with FIG. 10. In some aspects, the multi-layer communication is a MU-MIMO communication. In some aspects, the first indication may include a layer identifier associated with the MU-MIMO communication. In some aspects, the plurality of waveforms include a DFT-s-OFDM waveform and a CP-OFDM waveform.

At 1320, the UE may receive a second indication of a second waveform associated with downlink communications of a second UE. For example, the first UE may receive a second indication of a second waveform, of the plurality of waveforms, associated with downlink communications of a second UE, as described above in connection with FIG. 10. In some aspects, the second indication may include a layer identifier associated with the MU-MIMO communication.

At 1330, the UE may receive the one or more downlink communications using the first waveform. For example, the first UE may receive the one or more downlink communications using the first waveform, as described above in connection with FIG. 10. For example, a base station may generate the one or more downlink communications using the first waveform, and may transmit the one or more downlink communications to the first UE.

At 1340, the UE may process the one or more downlink communications based at least in part on the second indication. For example, the first UE may process the one or more downlink communications based at least in part on the second indication of the second waveform, as described above in connection with FIG. 10. In some aspects, the first UE may process the one or more downlink communications using interference cancellation based at least in part on the second indication of the second waveform associated with the downlink communications of the second UE.

Although FIG. 13 shows example blocks of a method of wireless communication, in some aspects, the method may include additional blocks, fewer blocks, different blocks, or differently arranged blocks than those shown in FIG. 13. Additionally, or alternatively, two or more blocks shown in FIG. 13 may be performed in parallel.

Figure 14:
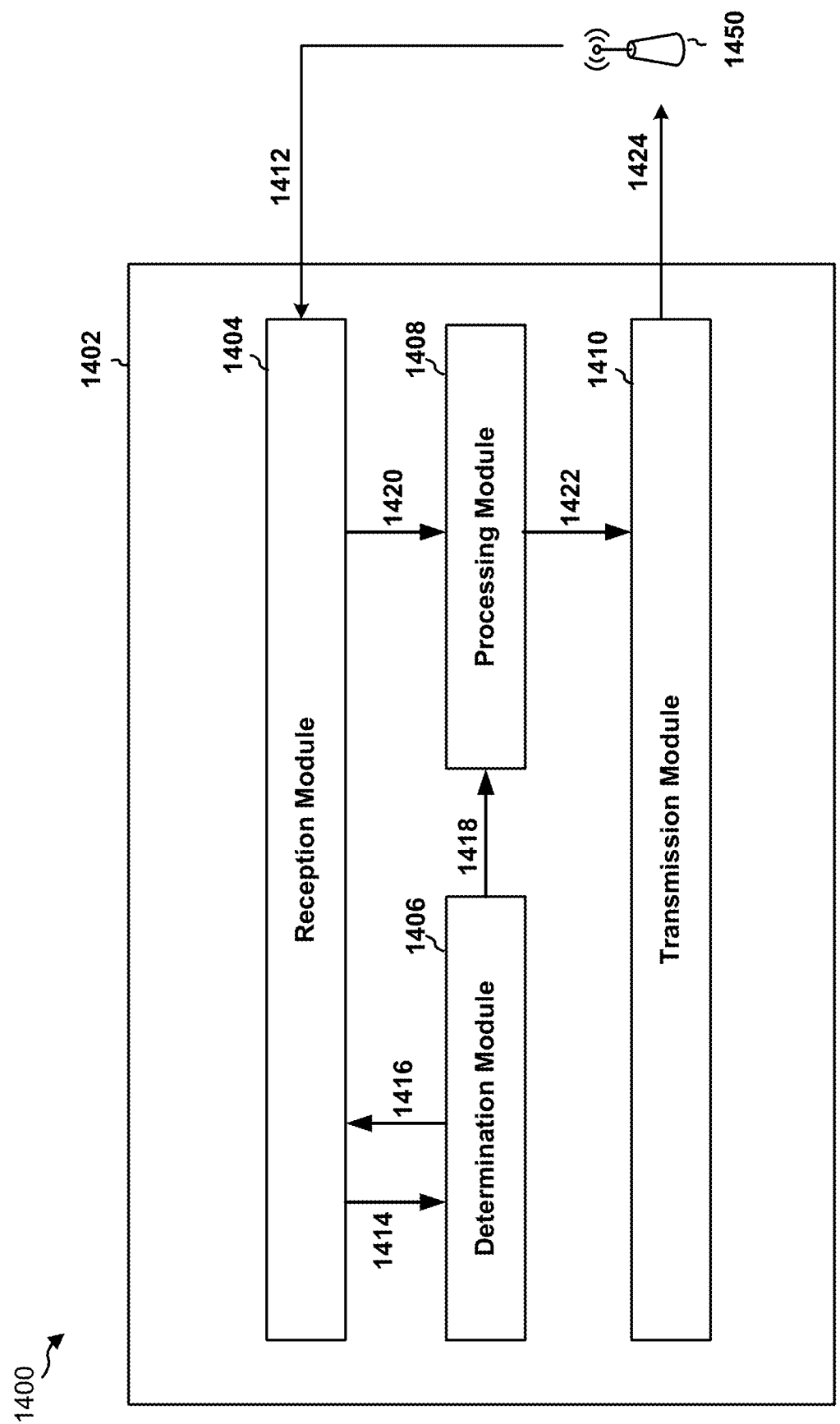
FIG. 14 is a conceptual data flow diagram illustrating the data flow between different modules/means/components in an example apparatus.

FIG. 14 is a conceptual data flow diagram 1400 illustrating the data flow between different modules/means/components in an example apparatus 1402. The apparatus 1402 may be a UE. In some aspects, the apparatus 1402 includes a reception module 1404, a determination module 1406, a processing module 1408, a transmission module 1410, and/or the like.

In some aspects, the reception module 1404 may receive a waveform indication, as data 1412 from a base station 1450, in a first downlink channel that uses a first waveform. The reception module 1404 may provide the waveform indication to the determination module 1406 as data 1414. The determination module 1406 may use the waveform indication to determine a second waveform to be used for one or more downlink communications in a second downlink channel. The determination module 1406 may provide an indication of the second waveform to the reception module 1404 as data 1416. The reception module 1404 may use this indication to receive the one or more downlink communications (e.g., as additional data 1412) in the second downlink channel using the second waveform. Additionally, or alternatively, the determination module 1406 may provide an indication of the second waveform to the processing module 1408 as data 1418. The processing module 1408 may process the one or more downlink communications, which may be received from the reception module 1404 as data 1420, using the indication of the second waveform. In some aspects, the processing module 1408 may provide data 1422 to the transmission module 1410, and the transmission module 1410 may transmit data 1424 (e.g., a response to the one or more downlink communications) to the base station 1450.

In some aspects, the reception module 1404 may receive a first indication of a first waveform and a second indication of a second waveform as data 1412 from the base station 1450. Furthermore, the reception module 1404 may receive one or more downlink communications, as additional data 1412, using the first waveform. The reception module 1404 may provide the first indication, the second indication, and the one or more downlink communications to the processing module 1408 as data 1420. The processing module 1408 may process the one or more downlink communications using the first indication and/or the second indication. In some aspects, the processing module 1408 and/or another module of the apparatus 1402 may generate data 1422 based at least in part on processing the one or more downlink communications, and may provide data 1422 to the transmission module 1410 for transmission to the base station 1450 as data 1424.

The apparatus may include additional modules that perform each of the blocks of the algorithm in the aforementioned flow charts of FIGS. 11 and/or 13. As such, each block in the aforementioned flow charts of FIGS. 11, and/or 13 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

The number and arrangement of modules shown in FIG. 14 are provided as an example. In practice, there may be additional modules, fewer modules, different modules, or differently arranged modules than those shown in FIG. 14. Furthermore, two or more modules shown in FIG. 14 may be implemented within a single module, or a single module shown in FIG. 14 may be implemented as multiple, distributed modules. Additionally, or alternatively, a set of modules (e.g., one or more modules) shown in FIG. 14 may perform one or more functions described as being performed by another set of modules shown in FIG. 14.

Figure 15:
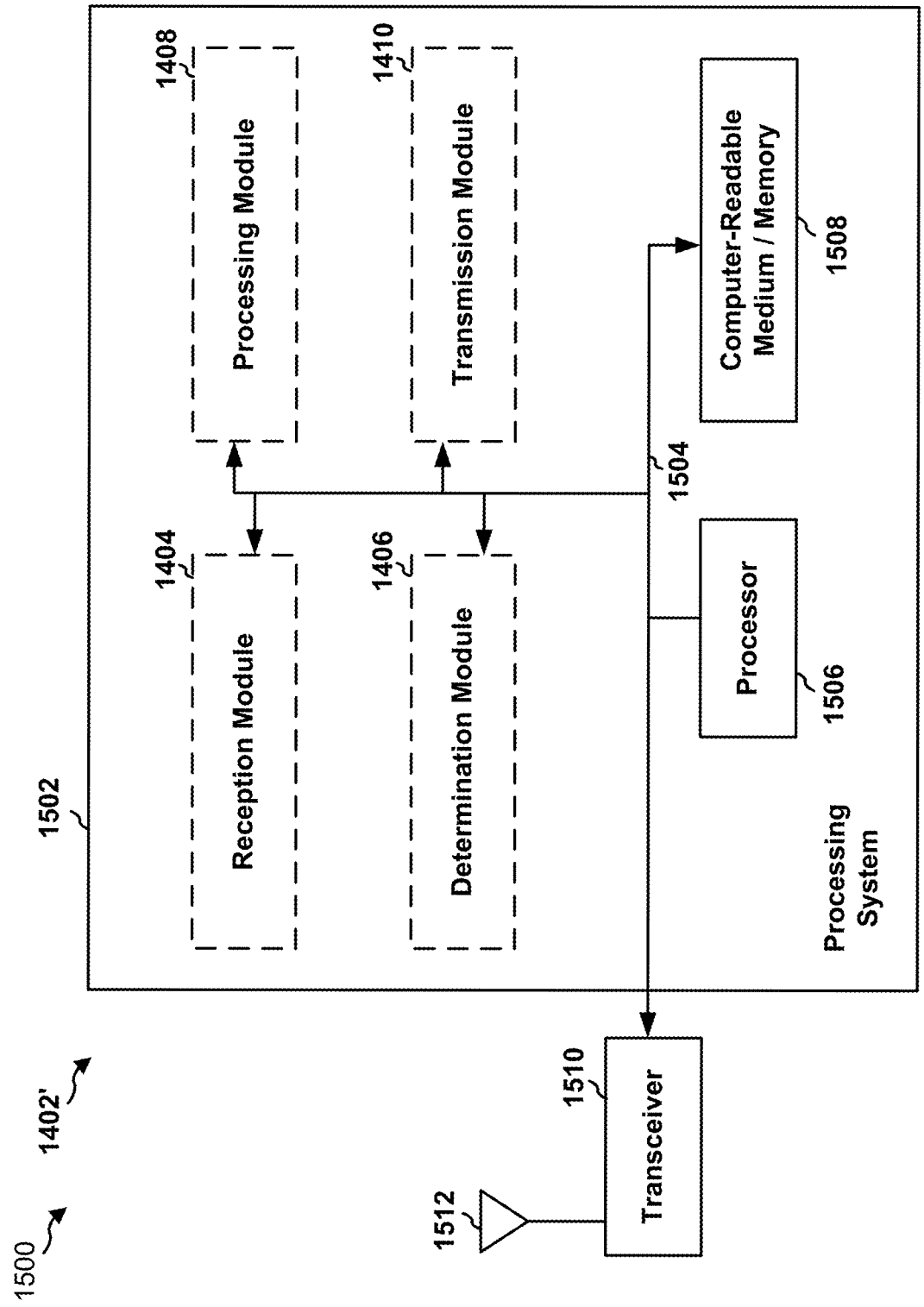
FIG. 15 is a diagram illustrating an example of a hardware implementation for an apparatus employing a processing system.

FIG. 15 is a diagram 1500 illustrating an example of a hardware implementation for an apparatus 1402' employing a processing system 1502. The apparatus 1402' may be a UE.

The processing system 1502 may be implemented with a bus architecture, represented generally by the bus 1504. The bus 1504 may include any number of interconnecting buses and bridges depending on the specific application of the processing system 1502 and the overall design constraints. The bus 1504 links together various circuits including one or more processors and/or hardware modules, represented by the processor 1506, the modules 1404, 1406, 1408, and/or 1410, and the computer-readable medium/memory 1508. The bus 1504 may also link various other circuits such as timing sources, peripherals, voltage regulators, and power management circuits, which are well known in the art, and therefore, will not be described any further.

The processing system 1502 may be coupled to a transceiver 1510. The transceiver 1510 is coupled to one or more antennas 1512. The transceiver 1510 provides a means for communicating with various other apparatus over a transmission medium. The transceiver 1510 receives a signal from the one or more antennas 1512, extracts information from the received signal, and provides the extracted information to the processing system 1502, specifically the reception module 1404. In addition, the transceiver 1510 receives information from the processing system 1502, specifically the transmission module 1410, and based at least in part on the received information, generates a signal to be applied to the one or more antennas 1512. The processing system 1502 includes a processor 1506 coupled to a computer-readable medium/memory 1508. The processor 1506 is responsible for general processing, including the execution of software stored on the computer-readable medium/memory 1508. The software, when executed by the processor 1506, causes the processing system 1502 to perform the various functions described supra for any particular apparatus. The computer-readable medium/memory 1508 may also be used for storing data that is manipulated by the processor 1506 when executing software. The processing system further includes at least one of the modules 1404, 1406, 1408, and/or 1410. The modules may be software modules running in the processor 1506, resident/stored in the computer readable medium/memory 1508, one or more hardware modules coupled to the processor 1506, or some combination thereof. The processing system 1502 may be a component of the UE 120 and may include the memory 282 and/or at least one of the TX MIMO processor 266, the RX processor 258, and/or the controller/processor 280.

In some aspects, the apparatus 1402/1402' for wireless communication may include means for receiving a waveform indication in a first downlink channel that uses a first waveform, means for determining a second waveform to be used for one or more downlink communications in a second downlink channel based at least in part on the waveform indication received in the first downlink channel, means for receiving the one or more downlink communications in the second downlink channel using the second waveform, means for processing the one or more downlink communications received in the second downlink channel using the second waveform, means for determining a configuration parameter based at least in part on the waveform indication, and/or the like. Additionally, or alternatively, the apparatus 1402/1402' for wireless communication may include means for receiving a first indication of a first waveform to be used for one or more downlink communications associated with a first UE, means for receiving a second indication of a second waveform associated with downlink communications of a second UE, means for receiving the one or more downlink communications using the first waveform, means for processing the one or more downlink communications based at least in part on the second indication of the second waveform, and/or the like. The aforementioned means may be one or more of the aforementioned modules of the apparatus 1402 and/or the processing system 1502 of the apparatus 1402' configured to perform the functions recited by the aforementioned means. As described supra, the processing system 1502 may include the TX MIMO processor 266, the RX processor 258, and/or the controller/processor 280. As such, in one configuration, the aforementioned means may be the TX MIMO processor 266, the RX processor 258, and/or the controller/processor 280 configured to perform the functions recited by the aforementioned means.

FIG. 15 is provided as an example. Other examples are possible and may differ from what was described in connection with FIG. 15.

Figure 16:
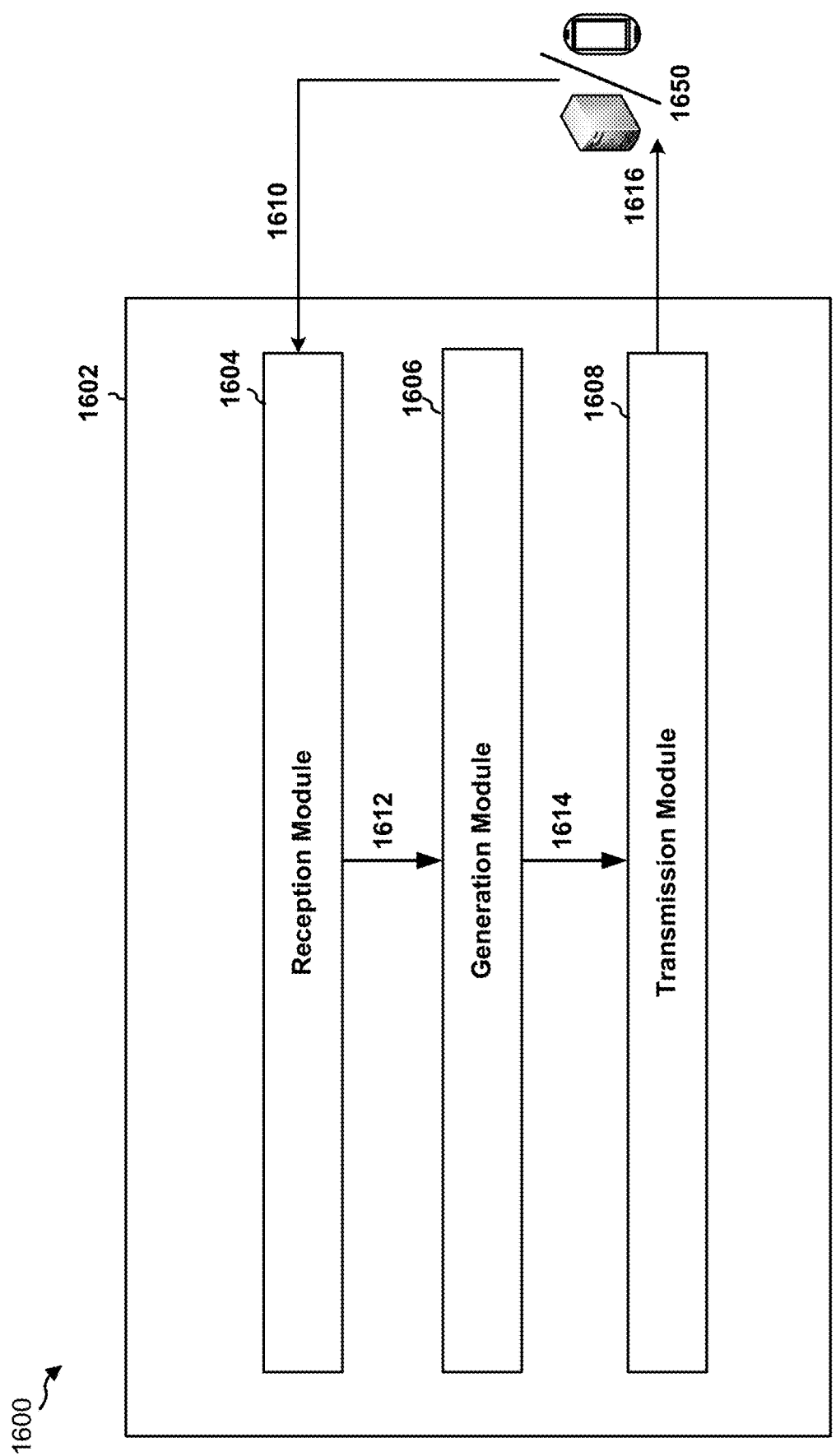
FIG. 16 is a conceptual data flow diagram illustrating the data flow between different modules/means/components in another example apparatus.

FIG. 16 is a conceptual data flow diagram 1600 illustrating the data flow between different modules/means/components in an example apparatus 1602. The apparatus 1602 may be a base station. In some aspects, the apparatus 1602 includes a reception module 1604, a generation module 1606, a transmission module 1608, and/or the like.

The reception module 1604 may receive data 1610 from a network device and/or a UE 1650, such as data destined for another UE. The reception module 1604 may provide information, as data 1612, to the generation module 1606 to trigger the generation of one or more transmissions to another UE 1650. The generation module 1606 may generate a first a first transmission layer of a multi-layer communication using a first waveform, and may generate a second transmission layer of the multi-layer communication using a second waveform. The generation module 1606 may provide the first and second transmission layers to the transmission module 1608 as data 1614. The transmission module 1608 may transmit the first transmission layer and the second transmission layer (e.g., as data 1616 to multiple UEs 1650) using a same time resource and a same frequency resource.

The apparatus may include additional modules that perform each of the blocks of the algorithm in the aforementioned flow chart of FIG. 12. As such, each block in the aforementioned flow chart of FIG. 12 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

The number and arrangement of modules shown in FIG. 16 are provided as an example. In practice, there may be additional modules, fewer modules, different modules, or differently arranged modules than those shown in FIG. 16. Furthermore, two or more modules shown in FIG. 16 may be implemented within a single module, or a single module shown in FIG. 16 may be implemented as multiple, distributed modules. Additionally, or alternatively, a set of modules (e.g., one or more modules) shown in FIG. 16 may perform one or more functions described as being performed by another set of modules shown in FIG. 16.

Figure 17:
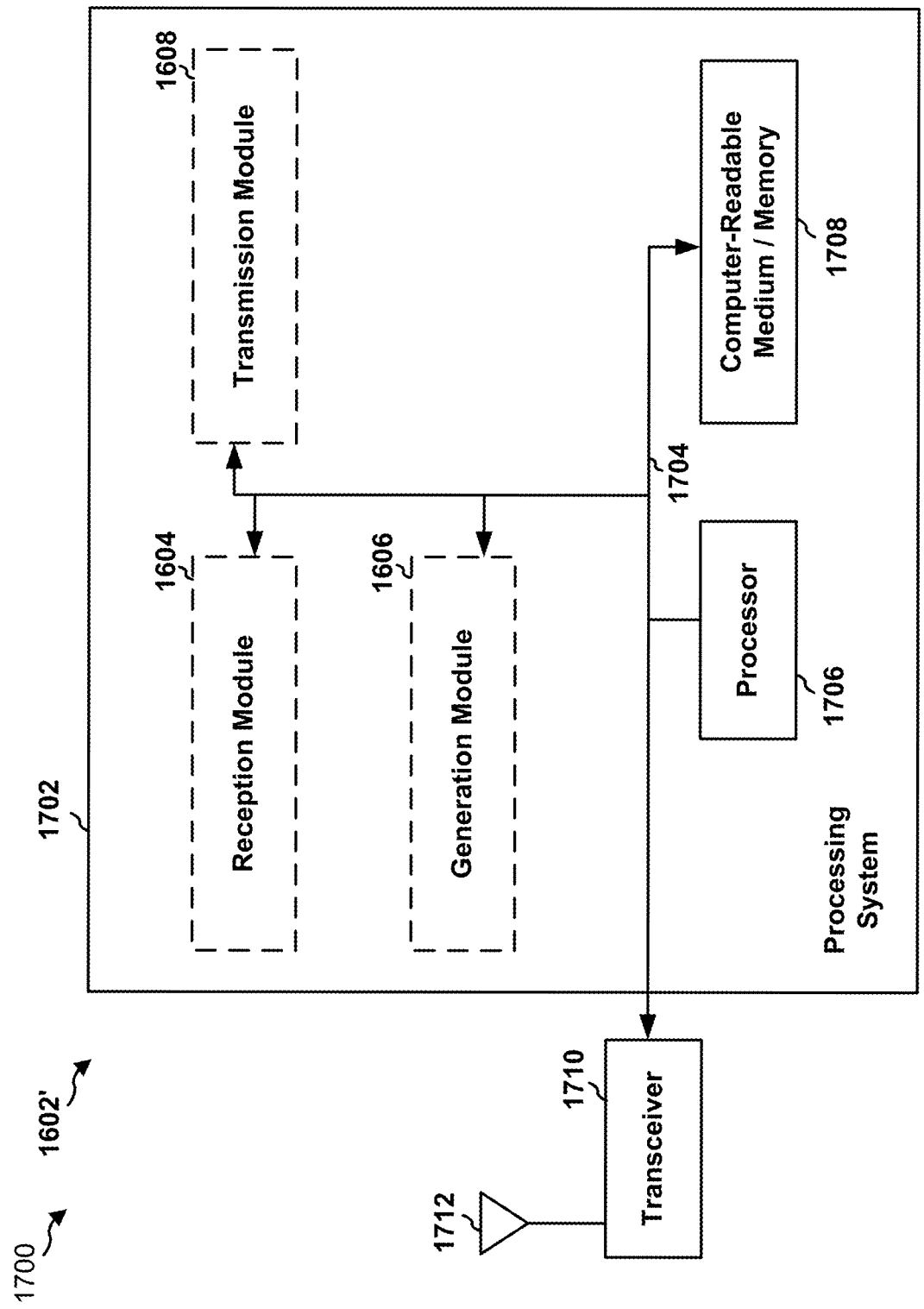
FIG. 17 is a diagram illustrating another example of a hardware implementation for an apparatus employing a processing system.

FIG. 17 is a diagram 1700 illustrating an example of a hardware implementation for an apparatus 1602' employing a processing system 1702. The apparatus 1602' may be a base station.

The processing system 1702 may be implemented with a bus architecture, represented generally by the bus 1704. The bus 1704 may include any number of interconnecting buses and bridges depending on the specific application of the processing system 1702 and the overall design constraints. The bus 1704 links together various circuits including one or more processors and/or hardware modules, represented by the processor 1706, the modules 1604, 1606, and/or 1608, and the computer-readable medium/memory 1708. The bus 1704 may also link various other circuits such as timing sources, peripherals, voltage regulators, and power management circuits, which are well known in the art, and therefore, will not be described any further.

The processing system 1702 may be coupled to a transceiver 1710. The transceiver 1710 is coupled to one or more antennas 1712. The transceiver 1710 provides a means for communicating with various other apparatus over a transmission medium. The transceiver 1710 receives a signal from the one or more antennas 1712, extracts information from the received signal, and provides the extracted information to the processing system 1702, specifically the reception module 1604. In addition, the transceiver 1710 receives information from the processing system 1702, specifically the transmission module 1608, and based at least in part on the received information, generates a signal to be applied to the one or more antennas 1712. The processing system 1702 includes a processor 1706 coupled to a computer-readable medium/memory 1708. The processor 1706 is responsible for general processing, including the execution of software stored on the computer-readable medium/memory 1708. The software, when executed by the processor 1706, causes the processing system 1702 to perform the various functions described supra for any particular apparatus. The computer-readable medium/memory 1708 may also be used for storing data that is manipulated by the processor 1706 when executing software. The processing system further includes at least one of the modules 1604, 1606, and/or 1608. The modules may be software modules running in the processor 1706, resident/stored in the computer readable medium/memory 1708, one or more hardware modules coupled to the processor 1706, or some combination thereof. The processing system 1702 may be a component of the BS 110 and may include the memory 242 and/or at least one of the TX MIMO processor 230, the RX processor 238, and/or the controller/processor 240.

In some aspects, the apparatus 1602/1602' for wireless communication includes means for generating a first transmission layer of a multi-layer communication using a first waveform of a plurality of waveforms, means for generating a second transmission layer of the multi-layer communication using a second waveform of the plurality of waveforms, means for transmitting the first transmission layer and the second transmission layer using a same time resource and a same frequency resource, means for transmitting at least one of an indication of the first waveform or an indication of the second waveform, and/or the like. The aforementioned means may be one or more of the aforementioned modules of the apparatus 1602 and/or the processing system 1702 of the apparatus 1602' configured to perform the functions recited by the aforementioned means. As described supra, the processing system 1702 may include the TX MIMO processor 230, the RX processor 238, and/or the controller/processor 240. As such, in one configuration, the aforementioned means may be the TX processor 230, the RX processor 238, and/or the controller/processor 240 configured to perform the functions recited by the aforementioned means.

FIG. 17 is provided as an example. Other examples are possible and may differ from what was described in connection with FIG. 17.

It is understood that the specific order or hierarchy of blocks in the processes/flow charts disclosed is an illustration of example approaches. Based upon design preferences, it is understood that the specific order or hierarchy of blocks in the processes/flow charts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication, comprising:
   receiving, by a first user equipment (UE), a first indication of a first waveform, of a plurality of waveforms, to be used for one or more downlink communications associated with the first UE, wherein the first indication includes a layer identifier that is associated with a multi-user multiple-input and multiple-output (MU-MIMO) communication;
   receiving, by the first UE, a second indication of a second waveform, of the plurality of waveforms, associated with downlink communications of a second UE;
   receiving, by the first UE, the one or more downlink communications using the first waveform; and
   processing, by the first UE, the one or more downlink communications based at least in part on the second indication of the second waveform.

2. The method of claim 1, wherein processing the one or more downlink communications comprises:
   processing the one or more downlink communications using interference cancellation based at least in part on the second indication of the second waveform associated with the downlink communications of the second UE.

3. The method of claim 1, wherein the first indication includes a waveform identifier that identifies the first waveform.

4. The method of claim 1, wherein the first indication identifies one or more configuration parameters that correspond to the first waveform.

5. The method of claim 1, wherein the layer identifier corresponds to the first waveform.

6. The method of claim 1, further comprising:
   determining the first waveform by using the layer identifier.

7. The method of claim 1,
   wherein the first waveform is used for a first transmission layer, and
   wherein the second waveform is used for a second transmission layer.

8. The method of claim 1, wherein the first waveform is a discrete Fourier transform spread orthogonal frequency division multiplexing (DFT-s-OFDM) waveform or a cyclic prefix orthogonal frequency division multiplexing (CP-OFDM) waveform.

9. The method of claim 1,
   wherein the first waveform is used to transmit the one or more downlink communications on a first layer to the first UE, and
   wherein the second waveform is used to transmit the downlink communications on a second layer to the second UE.

10. A method of wireless communication, comprising:
    generating, by a network entity, a first transmission layer of a multi-layer communication using a first waveform of a plurality of waveforms;
    generating, by the network entity, a second transmission layer of the multi-layer communication using a second waveform of the plurality of waveforms, wherein the first waveform and the second waveform are different;
    transmitting, by the network entity, an indication of the first waveform, wherein the indication includes a layer identifier that is associated with a multi-user multiple-input and multiple-output (MU-MIMO) communication; and
    transmitting, by the network entity, the first transmission layer and the second transmission layer using a same time resource and a same frequency resource, wherein the first transmission layer is transmitted using the first waveform and the second transmission layer is transmitted using the second waveform.

11. The method of claim 10, wherein the first transmission layer is transmitted to a first user equipment (UE) and the second transmission layer is transmitted to a second UE.

12. The method of claim 11, further comprising:
transmitting an indication of the second waveform to the first UE.

13. The method of claim 10, wherein the first transmission layer and the second transmission layer are transmitted using different antenna beams of the network entity.

14. The method of claim 10, wherein the first waveform is a discrete Fourier transform spread orthogonal frequency division multiplexing (DFT-s-OFDM) waveform or a cyclic prefix orthogonal frequency division multiplexing (CP-OFDM) waveform.

15. The method of claim 10,
wherein transmitting the indication comprises transmitting, to a UE, a first indication of the first waveform, and
wherein the method further comprises transmitting, to the UE, a second indication of the first waveform.

16. The method of claim 10, wherein the layer identifier corresponds to the first waveform.

17. The method of claim 10, further comprising:
transmitting, to a UE, an indication that identifies one or more configuration parameters that correspond to the first waveform.

18. A first user equipment (UE) for wireless communication, comprising:
memory; and
one or more processors, coupled to the memory, configured to:
receive a first indication of a first waveform, of a plurality of waveforms, to be used for one or more downlink communications associated with the first UE, wherein the first indication includes a layer identifier that is associated with a multi-user multiple-input and multiple-output (MU-MIMO) communication;
receive a second indication of a second waveform, of the plurality of waveforms, associated with downlink communications of a second UE;
receive the one or more downlink communications using the first waveform; and
process the one or more downlink communications based at least in part on the second indication of the second waveform.

19. The first UE of claim 18, wherein, when processing the one or more downlink communications, the one or more processors are configured to:
process the one or more downlink communications using interference cancellation based at least in part on the second indication of the second waveform associated with the downlink communications of the second UE.

20. The first UE of claim 18, wherein the first indication identifies one or more configuration parameters that correspond to the first waveform.

21. The first UE of claim 18, wherein the layer identifier corresponds to the first waveform.

22. The first UE of claim 18, wherein the first waveform is a discrete Fourier transform spread orthogonal frequency division multiplexing (DFT-s-OFDM) waveform.

23. The first UE of claim 18, wherein the second waveform is a cyclic prefix orthogonal frequency division multiplexing (CP-OFDM) waveform.

24. The first UE of claim 18, wherein, when receiving the one or more downlink communications, the one or more processors are configured to:
receive, via a first layer, the one or more downlink communications using the first waveform, and
wherein the first layer is different from a second layer via which the second UE receives the downlink communications using the second waveform.

25. A network entity for wireless communication, comprising:
memory; and
one or more processors, coupled to the memory, the one or more processors configured to:
generate a first transmission layer of a multi-layer communication using a first waveform of a plurality of waveforms;
generate a second transmission layer of the multi-layer communication using a second waveform of the plurality of waveforms;
transmit an indication of the first waveform, wherein the indication includes a layer identifier that is associated with a multi-user multiple-input and multiple-output (MU-MIMO) communication; and
transmit the first transmission layer and the second transmission layer using a same time resource and a same frequency resource, wherein the first transmission layer is transmitted using the first waveform and the second transmission layer is transmitted using the second waveform.

26. The network entity of claim 25, wherein, when transmitting the first transmission layer and the second transmission layer, the one or more processors are configured to:
transmit the first transmission layer to a first user equipment (UE), and
transmit the second transmission layer is transmitted to a second UE.

27. The network entity of claim 26, wherein the one or more processors are further configured to:
transmit an indication of the second waveform to the first UE.

28. The network entity of claim 25, wherein, when transmitting the first transmission layer and the second transmission layer, the one or more processors are configured to:
transmit the first transmission layer and the second transmission layer using different antenna beams of the network entity.

29. The network entity of claim 25, wherein the first waveform is a discrete Fourier transform spread orthogonal frequency division multiplexing (DFT-s-OFDM) waveform or a cyclic prefix orthogonal frequency division multiplexing (CP-OFDM) waveform.

30. The network entity of claim 25, wherein the layer identifier corresponds to the first waveform.

* * * * *